(12) United States Patent
Zhang et al.

(10) Patent No.: US 11,115,869 B2
(45) Date of Patent: Sep. 7, 2021

(54) SDN-CONTROLLED BANDWIDTH SHARING METHOD FOR USE WITH TERMINAL SMALL CELL, AND BANDWIDTH SHARING DEVICE

(71) Applicant: YULONG COMPUTER TELECOMMUNICATION SCIENTIFIC (SHENZHEN) CO., LTD., Shenzhen (CN)

(72) Inventors: Yun-Fei Zhang, Shenzhen (CN); Qian Zheng, Shenzhen (CN); Yi-Xue Lei, Shenzhen (CN)

(73) Assignee: YULONG COMPUTER TELECOMMUNICATION SCIENTIFIC (SHENZHEN) CO., LTD., Shenzhen (CN)

( * ) Notice: Subject to any disclaimer, the term of this patent is extended or adjusted under 35 U.S.C. 154(b) by 475 days.

(21) Appl. No.: 16/075,151

(22) PCT Filed: Sep. 28, 2016

(86) PCT No.: PCT/CN2016/100549
§ 371 (c)(1),
(2) Date: Aug. 3, 2018

(87) PCT Pub. No.: WO2017/133261
PCT Pub. Date: Aug. 10, 2017

(65) Prior Publication Data
US 2019/0045401 A1 Feb. 7, 2019

(30) Foreign Application Priority Data

Feb. 3, 2016 (CN) .......................... 201610077969.8

(51) Int. Cl.
*H04W 28/20* (2009.01)
*H04L 12/919* (2013.01)
(Continued)

(52) U.S. Cl.
CPC .......... *H04W 28/20* (2013.01); *H04L 47/765* (2013.01); *H04W 24/02* (2013.01); *H04W 40/02* (2013.01); *H04W 92/14* (2013.01)

(58) Field of Classification Search
CPC ...... H04W 24/02; H04W 28/20; H04W 40/02
See application file for complete search history.

(56) References Cited

U.S. PATENT DOCUMENTS

2016/0057679 A1* 2/2016 Werner ................. H04W 52/04
455/444
2016/0183163 A1* 6/2016 Yang ..................... H04W 40/02
370/235
(Continued)

FOREIGN PATENT DOCUMENTS

CN 102970713 A 3/2013
CN 103988542 A 8/2014
(Continued)

*Primary Examiner* — Kodzovi Acolatse
*Assistant Examiner* — Farhad Ali
(74) *Attorney, Agent, or Firm* — ScienBiziP, P.C.

(57) ABSTRACT

A bandwidth sharing method and device based on SDN control of terminal cell are disclosed. The bandwidth sharing method includes: determining, by a SDN controller, whether a trigger request for bandwidth sharing is received; upon receipt of the trigger request, selecting at least one second terminal cell for providing bandwidth sharing to the first terminal cell; controlling the first terminal cell and the at least one second terminal cell to jointly process the target service. The trigger request indicates a need of bandwidth sharing of a first terminal cell from other terminal cells when processing a target service on a backhaul link, and a bandwidth requirement of the target service equals to or exceeds a first predetermined threshold. The SDN controlled bandwidth-sharing scheme may ensure the application of a wireless backhaul sharing mechanism between T-SCs, (Continued)

thereby achieving flexible configuration of bandwidth resources on the backhaul link.

12 Claims, 16 Drawing Sheets

(51) Int. Cl.
*H04W 24/02* (2009.01)
*H04W 40/02* (2009.01)
*H04W 92/14* (2009.01)

(56) References Cited

U.S. PATENT DOCUMENTS

2017/0289976 A1* 10/2017 Lai ................... H04W 28/02
2018/0070285 A1* 3/2018 Benko ................ H04L 43/10

FOREIGN PATENT DOCUMENTS

| | | |
|---|---|---|
| CN | 104581816 A | 4/2015 |
| CN | 104717685 A | 6/2015 |
| CN | 105764098 A | 7/2016 |
| EP | 2677814 A1 | 12/2013 |

* cited by examiner

SDN-CONTROLLED BANDWIDTH SHARING METHOD FOR USE WITH TERMINAL SMALL CELL, AND BANDWIDTH SHARING DEVICE

CROSS-REFERENCE TO RELATED APPLICATIONS

This application claims priority of Chinese Patent Application No. 201610077969.8, entitled "SDN-controlled bandwidth sharing method for use with terminal cells and bandwidth sharing device," filed on Feb. 3, 2016 in the SIPO (State Intellectual Property Office of the People's Republic of China), the entire contents of which are incorporated by reference herein.

FIELD

The instant disclosure pertains to the field of communication technology, and in particular, to a bandwidth sharing method and device of terminal cell based on SDN (software defined network) control.

BACKGROUND

With the wide application of LTE (Long Term Evolution) technology, the traditional macro cell (Macrocell) encounters bottlenecks in network construction and coverage provision. The hotspots and blind spots of the network require flexible deployment schemes for improvement. In response, while employing macrocell coverage, network operators deploy small cell scheme to achieve deep coverage and capacity enhancement of the network, thereby supporting future 5G ultra-dense networking.

FIG. 1 shows a network architecture diagram that illustrates comparison between three types of Small Cell solutions:

The first type of Small Cell solution includes schemes for home base stations (such as Femtocell, Picocell, etc.), which require a cable-based backhaul and need to maintain the S1 and S5 interfaces on the cell-to-core network side. Access to the core network is only applicable to the areas where these cells are deployed. For areas where network coverage is not good enough to provide wireless coverage or areas that cannot provide backhaul, rapid deployment or short-term capacity improvement (such as public safety) will be difficult to achieve. Therefore, flexibility of this type of small cell solution is limited.

The second type of solution includes MiFi router solution. Although this type of solution is based on wireless backhaul, the terminal access MiFi works in the WLAN (Wireless Local Area Networks) unlicensed band, which may be prone to interference and lead to difficulties in guaranteeing QoS (Quality of Service, Quality of service).

The third type of solution is to provide Small Cell access through a terminal, that is, a T-SC (Terminal Small Cell). The terminal implements access to the T-SC and the T-SC based wireless backhaul by using, for example, D2D (Device-to-Device) technology and Relay technology. Because the T-SC can provide access based on the LTE licensed band and wireless backhaul, the T-SC becomes the most flexible and controllable Small Cell access solution.

In the third type of scheme, the terminal aggregated by the T-SC is actually accessed by the radio bearer established by the T-SC and the network as wireless backhaul. By adopting access cooperation scheme based on D2D X2 among the T-SCs, the wireless backhaul link of multiple T-SCs can be shared, thereby providing increased flexibility over traditional small cell technology. However, when the T-SC wireless backhaul resources are actually utilized, the routing from the T-SC aggregated terminal to the network side is still limited by factors such as the energy consumption status of the T-SC, the available bandwidth, and the cost of providing access. Currently adopted technology still does not effectively utilize these global status information, which may render this wireless backhaul sharing mechanism difficult to apply.

Therefore, how to effectively ensure the wireless backhaul sharing mechanism between T-SCs to achieve flexible bandwidth configuration remains a technical problem to be addressed.

SUMMARY

Embodiments of the instant disclosure address at least one of the technical problems mentioned above, and provide a bandwidth-sharing scheme for terminal cells based on software-defined network (SDN) control, so that a SDN controller can bundle the bandwidth resources of multiple T-SCs on the backhaul link for high-bandwidth services. The disclosed bandwidth-sharing scheme may ensure that the wireless backhaul sharing mechanism between T-SCs can be applied, thereby achieving flexible configuration of bandwidth resources on the backhaul link.

Accordingly, a first aspect of the instant disclosure provides a bandwidth sharing method based on SDN control of terminal cell, which comprises: determining, by a SDN controller, whether a trigger request for bandwidth sharing is received, wherein the trigger request indicates a need of bandwidth sharing of a first terminal cell from other terminal cells when processing a target service on a backhaul link, and a bandwidth requirement of the target service equals to or exceeds a first predetermined threshold; upon receipt of the trigger request, selecting at least one second terminal cell for providing bandwidth sharing to the first terminal cell; and controlling the first terminal cell and the at least one second terminal cell to jointly process the target service.

In the disclosed embodiment, the SDN controller selects at least one terminal cell (e.g., one or more second terminal cells) to provide bandwidth sharing to the to any one of the foregoing terminal cells (e.g., the first terminal cell) when receiving a trigger request for shared bandwidth, thus controlling the first terminal cell and the at least one selected second terminal cell to jointly process a target service. As such, the SDN controller can bundle the bandwidth resources of multiple T-SCs on the backhaul link for services that impose high bandwidth requirements (i.e., for target services whose bandwidth requirement equals to or exceeds a first predetermined threshold). The disclosed bandwidth-sharing scheme may therefore ensure that the wireless backhaul sharing mechanism between T-SCs can be applied, thereby achieving flexible configuration of bandwidth resources on the backhaul link.

In the disclosed embodiment, the process of controlling the first and the second terminal cell to jointly process the target service includes: respectively configuring a service data routing policy for each of the second terminal cell and the first terminal cell; transmitting the respective routing policy of the first terminal cell and the second terminal cell to a base station that provides backhaul link to the first and the second terminal cells, wherein the base station respectively forwards the routing policy to a corresponding terminal cell, so as to enable joint routing of the service data of the target service to the base station based on the respectively configured routing policy.

In the disclosed embodiment, by configuring a routing policy to each of the first terminal cell and the at least one second terminal cells, the SDN controller can comprehensively integrate a global topology into any of the foregoing terminal cells and configure an optimal route for each of the terminal cells, so as to improve data transmission efficiency between the terminal cells and the base station.

Specifically, the routing policy provided to the terminal cells may be configured in accordance to the state information of the terminal cell, the path information between the terminal cells, and the path information between the terminal cell and the base station. The status information of the terminal cell may include address information, energy consumption information, and available bandwidth information. The path information between the terminal cells may include path delay information and path cost information. The path information between the terminal cells and the base station may include path delay information and path cost information.

In any one of the foregoing embodiments, the bandwidth-sharing method may further include: configuring a routing policy to the network side server for the base station; and sending the routing policy to the network side server to the base station, so as to enable the base station to route the service data to the network side service according to the allocated routing policy.

In the disclosed embodiment, by configuring a routing policy to the network side server for the base station, the SDN controller can likewise configure an optimal route for the base station based on the integrated global topology, so as to improve data transmission efficiency between the base station and the network side server.

In any one of the foregoing embodiments, the bandwidth-sharing method may further include: determining the number of the second terminal cell based on at least one of capability information of the SDN controller or data characteristics of the target service. The capability information of the SDN controller may include computing capability information.

In any one of the foregoing embodiments, the trigger request may include: available bandwidth information, bandwidth requirement of the target service, and remaining power information of the first terminal cell.

Moreover, a second aspect of the instant disclosure provides a bandwidth sharing method based on SDN control of terminal cells, including: determining, by a terminal cell when processing a target service on a backhaul link, a need for bandwidth sharing from other terminal cells according to a status information of the terminal cell, wherein a bandwidth requirement of the target service equals to or exceeds a first predetermined threshold; and upon determining the need for bandwidth sharing from other terminal cells, transmitting a bandwidth sharing trigger request to a SDN controller through a base station.

In one embodiment, when a terminal cell processes a high bandwidth service on the backhaul link (i.e., the target service whose bandwidth requirement equals to or exceeds a first predetermined threshold), if a need for bandwidth sharing from other terminal cell(s) is determined, a trigger request for bandwidth-sharing may be sent through the base station to the SDN controller. Accordingly, the SDN controller can select at least one terminal cell (e.g., a second terminal cell) to provide the bandwidth sharing to any of the above-mentioned terminal cells (e.g., the first terminal cell), so as to control the first terminal cell and the selected at least one second terminal cell to jointly processes the target service. As such, it is ensured that the SDN controller can bundle the bandwidth resources of multiple T-SCs on the backhaul link for services that impose high bandwidth requirements. The disclosed bandwidth-sharing scheme may therefore ensure that the wireless backhaul sharing mechanism between T-SCs can be applied, thereby achieving flexible configuration of bandwidth resources on the backhaul link In one embodiment, the process of determining a need for bandwidth sharing according to a status information of the terminal cell may include: confirming the need for bandwidth sharing from other terminal cells upon at least one of the following conditions: when available bandwidth of the terminal cell is insufficient to meet the bandwidth requirement of the target service, and when remaining power of the terminal cell is lower than a first predetermined power value.

In any one of the foregoing embodiments, the bandwidth sharing method may further include: determining whether an available bandwidth of the terminal cell equals to or exceeds a second predetermined threshold, and determining whether the terminal cell's remaining power equals to or exceeds a second predetermined power value; upon determining that the available bandwidth equals to or exceeds the second predetermined threshold, and the remaining power equals to or exceeds the second predetermined power value, transmitting an information of the terminal cell to the SDN controller through the base station, so as to enable the SDN controller to determine whether to select the terminal cell for providing bandwidth sharing to other terminal cells.

In one embodiment, when a terminal cells have more available bandwidth (i.e., having bandwidth equals to or exceeds a second predetermined threshold), and the remaining power is also sufficient (i.e., greater than or equal to a second predetermined power value), the available terminal cell may send its own information to the SDN, controller so that the SDN controller may determine whether to select the available terminal cell for providing bandwidth sharing to other terminal cells.

Moreover, a third aspect of the instant disclosure provides a method for bandwidth sharing based on SDN control in a terminal cell, including: acquiring, by a base station, a status information of a first terminal cell that processes a target service on a backhaul link, and based on the status information of the first terminal cell and a status information of the base station, determining whether there is a need for bandwidth sharing from one or more other terminal cells to the first terminal cell, wherein a bandwidth requirement of the target service equals to or exceeds a first predetermined threshold; and, upon determining the need for bandwidth sharing from other terminal cell to the first terminal cell, transmitting to a SDN controller a trigger request for bandwidth sharing.

In one embodiment, the base station sends a trigger request for sharing bandwidth to the SDN controller upon determining a need for bandwidth sharing from other terminal cell (e.g., one or more second terminal cells) to a particular terminal cell (e.g., the first terminal cell). Accordingly, the SDN controller can select at least one terminal cell (e.g., a second terminal cell) to provide the bandwidth sharing to any of the above-mentioned terminal cells (e.g., the first terminal cell), so as to control the first terminal cell and the selected at least one second terminal cell to jointly processes the target service. As such, it is ensured that the SDN controller can bundle the bandwidth resources of multiple T-SCs on the backhaul link for services that impose high bandwidth requirements. The disclosed bandwidth-sharing scheme may therefore ensure that the wireless backhaul sharing mechanism between T-SCs can be applied, thereby achieving flexible configuration of bandwidth resources on the backhaul link.

In one embodiment, the process of determining whether there is a need for bandwidth sharing from one or more other terminal cells to the first terminal cell based on the status information of the first terminal cell and a status information of the base station may include:

when: an available bandwidth of the first terminal cell is insufficient to meet the bandwidth requirement of the target service, and an available bandwidth of the base station is insufficient to be allocated to the first terminal cell, or when a cost for the base station to provide bandwidth to the first terminal cell is higher than expected, confirming the need for bandwidth sharing from other terminal cells to the first terminal cell.

In one embodiment, the bandwidth sharing method further includes: determining the cost for the base station to provide bandwidth to the first terminal cell based on a network status of the base station and a performance requirement of the target service, wherein, the network status includes network capacity and loading, and the performance requirement of the target service includes bandwidth requirement, delay requirement, and quality of service requirement.

It should be noted that, the "cost for the base station to provide bandwidth" described herein mainly considers the high bandwidth, low latency, and high QoS characteristics of the mobile Internet services. If the wireless backhaul of a terminal cell is less than ideal, it may not be able to satisfy the service requirement, and the base station may need to sacrifice network capacity to guarantee the resources of the backhaul link. Therefore, it requires comprehensive consideration for the base station to determine the cost of bandwidth provision.

In any one of the foregoing embodiments, the bandwidth sharing method further includes: determining whether the trigger request for bandwidth sharing is received from the first terminal cell; upon determining receipt of the trigger request for bandwidth sharing from the first terminal cell, forwarding the trigger request for bandwidth sharing to the SDN controller.

In one embodiment, the trigger request for bandwidth sharing is sent from the first terminal cell, and the base station acts as a relay device between the terminal cell and the SDN controller.

In any one of the foregoing embodiments, the bandwidth sharing method may further include: receiving a routing policy respectively configured by the SDN controller for the base station, the first terminal cell, and each of the one or more other terminal cell that provides bandwidth sharing for the first terminal cell; and respectively forwarding the routing policy configured by the SDN controller for the first terminal cell and each of the other terminal cell to a corresponding terminal cell.

In one embodiment, by receiving a routing policy configured by the SDN controller for the base station, the base station can communicate with the network side server based on an optimized route assigned by the SDN controller (the SDN controller can comprehensively integrate global topology and configure an optimal route for the base station), thereby improving routing efficiency between the base station and the network side server. Moreover, by respectively forwarding the routing policy configured by the SDN controller for the first terminal cell and each of the other terminal cell to a corresponding terminal cell, the first and the at least one second terminal cell may communicate with the base station based on an optimized route configured by the SDN controller (the SDN controller can comprehensively integrate global topology and flexibly configure optimal routing for each of the terminal cells), thereby enhancing the data transmission efficiency between the terminal cells and the base station.

Furthermore, a fourth aspect of the instant disclosure provides a bandwidth sharing device of terminal cell based on SDN control, applicable in a SND controller, which may include: a determining unit, configured to determine whether a trigger request for bandwidth sharing is received, wherein the trigger request indicates a need of bandwidth sharing of a first terminal cell from other terminal cells when processing a target service on a backhaul link, and a bandwidth requirement of the target service equals to or exceeds a first predetermined threshold; a selecting unit, configured to select one or more second terminal cells to provide bandwidth sharing for the first terminal cell upon determining receipt of the trigger request, and a control unit, configured to control the first terminal cell and the one or more second terminal cells to jointly process the target service.

In the disclosed embodiment, the SDN controller selects at least one terminal cell (e.g., one or more second terminal cells) to provide bandwidth sharing to the to any one of the foregoing terminal cells (e.g., the first terminal cell) when receiving a trigger request for shared bandwidth, thus controlling the first terminal cell and the at least one selected second terminal cell to jointly process a target service. As such, the SDN controller can bundle the bandwidth resources of multiple T-SCs on the backhaul link for services that impose high bandwidth requirements (i.e., for target services whose bandwidth requirement equals to or exceeds a first predetermined threshold). The disclosed bandwidth-sharing scheme may therefore ensure that the wireless backhaul sharing mechanism between T-SCs can be applied, thereby achieving flexible configuration of bandwidth resources on the backhaul link.

In the disclosed embodiment, the control unit may include: a configuration unit, for respectively configuring a service data routing policy for each of the second terminal cell and the first terminal cell; a transmitting unit, for transmitting the respective routing policy of the first terminal cell and the second terminal cell to a base station that provides backhaul link to the first and the second terminal cells, wherein the base station respectively forwards the routing policy to a corresponding terminal cell, so as to enable joint routing of the service data of the target service to the base station based on the respectively configured routing policy.

In the disclosed embodiment, by configuring a routing policy to each of the first terminal cell and the at least one second terminal cells, the SDN controller can comprehensively integrate a global topology into any of the foregoing terminal cells and configure an optimal route for each of the terminal cells, so as to improve data transmission efficiency between the terminal cells and the base station.

Specifically, the routing policy provided to the terminal cells may be configured in accordance to the state information of the terminal cell, the path information between the terminal cells, and the path information between the terminal cell and the base station. The status information of the terminal cell may include address information, energy consumption information, and available bandwidth information. The path information between the terminal cells may include path delay information and path cost information. The path information between the terminal cells and the base station may include path delay information and path cost information.

In any one of the foregoing embodiments, the configuration unit may be further configured to: configure routing policy to the network side server for the base station. The transmitting unit is further configured to: transmitting the routing policy to the network side server configured by the configuration unit for the base station to the base station, so as to enable the base station to route the service data to the network side server based on the assigned routing policy.

In the disclosed embodiment, by configuring a routing policy to the network side server for the base station, the SDN controller can likewise configure an optimal route for the base station based on the integrated global topology, so as to improve data transmission efficiency between the base station and the network side server.

In any of the foregoing embodiments, the selecting unit may further be configured to: determining the number of the second terminal cell based on at least one of capability information of the SDN controller or data characteristics of the target service.

In any of the foregoing embodiments, the trigger request comprises: available bandwidth information, bandwidth requirement of the target service, and remaining power information of the first terminal cell.

Moreover, a fifth aspect of the instant disclosure provides a bandwidth sharing device of terminal cell based on SDN control, applicable in a terminal cell, which may include: a determining unit, configured to determine a need for bandwidth sharing from other terminal cells according to a status information of the terminal cell, when the terminal cell processes a target service on a backhaul link, wherein a bandwidth requirement of the target service equals to or exceeds a first predetermined threshold; and a transmitting unit, configured to transmit a bandwidth sharing trigger request to a SDN controller through a base station upon determining the need for bandwidth sharing from other terminal cells.

In one embodiment, when a terminal cell processes a high bandwidth service on the backhaul link (i.e., the target service whose bandwidth requirement equals to or exceeds a first predetermined threshold), if a need for bandwidth sharing from other terminal cell(s) is determined, a trigger request for bandwidth-sharing may be sent through the base station to the SDN controller. Accordingly, the SDN controller can select at least one terminal cell (e.g., a second terminal cell) to provide the bandwidth-sharing to any of the above-mentioned terminal cells (e.g., the first terminal cell), so as to control the first terminal cell and the selected at least one second terminal cell to jointly processes the target service. As such, it is ensured that the SDN controller can bundle the bandwidth resources of multiple T-SCs on the backhaul link for services that impose high bandwidth requirements. The disclosed bandwidth-sharing scheme may therefore ensure that the wireless backhaul sharing mechanism between T-SCs can be applied, thereby achieving flexible configuration of bandwidth resources on the backhaul link.

In the disclosed embodiment, the determining unit is further configured to: confirm the need for bandwidth sharing from other terminal cells upon at least one of the following conditions: when available bandwidth of the terminal cell is insufficient to meet the bandwidth requirement of the target service, and when remaining power of the terminal cell is lower than a first predetermined power value.

In any of the foregoing embodiments, the bandwidth sharing device may further include: a judging unit that is configured to determine whether an available bandwidth of the terminal cell equals to or exceeds a second predetermined threshold, and determining whether the terminal cell's remaining power equals to or exceeds a second predetermined power value. The transmitting unit is further configured to: transmit an information of the terminal cell to the SDN controller through the base station upon determining that the available bandwidth equals to or exceeds the second predetermined threshold and the remaining power equals to or exceeds the second predetermined power value, so as to enable the SDN controller to determine whether to select the terminal cell for providing bandwidth sharing to other terminal cells.

In the disclosed embodiment, when a terminal cells have more available bandwidth (i.e., having bandwidth equals to or exceeds a second predetermined threshold), and the remaining power is also sufficient (i.e., greater than or equal to a second predetermined power value), the available terminal cell may send its own information to the SDN, controller so that the SDN controller may determine whether to select the available terminal cell for providing bandwidth sharing to other terminal cells.

Moreover, a sixth aspect of the instant disclosure provides a bandwidth sharing device of terminal cell based on SDN control, applicable in a base station, which may include: an acquiring unit, configured to acquire a status information of a first terminal cell that processes a target service on a backhaul link, wherein a bandwidth requirement of the target service equals to or exceeds a first predetermined threshold; a determining unit, configured to determine whether there is a need for bandwidth sharing from one or more other terminal cells to the first terminal cell based on the status information of the first terminal cell and a status information of the base station; and a transmitting unit, configured to transmit to a SDN controller a trigger request for bandwidth sharing upon determining the need for bandwidth sharing from other terminal cell to the first terminal cell.

In the disclosed embodiment, the base station sends a trigger request for sharing bandwidth to the SDN controller upon determining a need for bandwidth sharing from other terminal cell(s) to a particular terminal cell (e.g., the first terminal cell). Accordingly, the SDN controller can select at least one terminal cell (e.g., a second terminal cell) to provide the bandwidth sharing to any of the above-mentioned terminal cells (e.g., the first terminal cell), so as to control the first terminal cell and the selected at least one second terminal cell to jointly processes the target service. As such, it is ensured that the SDN controller can bundle the bandwidth resources of multiple T-SCs on the backhaul link for services that impose high bandwidth requirements. The disclosed bandwidth-sharing scheme may therefore ensure that the wireless backhaul sharing mechanism between T-SCs can be applied, thereby achieving flexible configuration of bandwidth resources on the backhaul link.

In the disclosed embodiment, the determining unit may be further configured to: confirm the need for bandwidth sharing from other terminal cells to the first terminal cell when: an available bandwidth of the first terminal cell is insufficient to meet the bandwidth requirement of the target service, and an available bandwidth of the base station is insufficient to be allocated to the first terminal cell, or a cost for the base station to provide bandwidth to the first terminal cell is higher than expected.

In one embodiment, the determining unit may be further configured to: determine the cost for the base station to provide bandwidth to the first terminal cell based on a network status of the base station and a performance requirement of the target service, wherein the network status includes network capacity and loading, and the performance requirement of the target service includes bandwidth requirement, delay requirement, and quality of service requirement.

It should be noted that, the "cost for the base station to provide bandwidth" described herein mainly considers the high bandwidth, low latency, and high QoS characteristics of the mobile Internet services. If the wireless backhaul of a terminal cell is less than ideal, it may not be able to satisfy the service requirement, and the base station may need to sacrifice network capacity to guarantee the resources of the backhaul link. Therefore, it requires comprehensive consideration for the base station to determine the cost of bandwidth provision.

In any one of the foregoing embodiments, the bandwidth sharing device may further include: a judging unit, configured to determine whether the trigger request for bandwidth sharing is received from the first terminal cell. The transmitting unit is further configured to forward the trigger request for bandwidth sharing to the SDN controller upon determining receipt of the trigger request for bandwidth sharing from the first terminal cell.

In the disclosed embodiment, the trigger request for bandwidth sharing is sent from the first terminal cell, and the base station acts as a relay device between the terminal cell and the SDN controller.

In any one of the foregoing embodiments, the bandwidth sharing device may further include: a receiving unit, configured to receive a routing policy respectively configured by the SDN controller for the base station, the first terminal cell, and each of the one or more other terminal cell that provides bandwidth sharing for the first terminal cell. The transmitting unit is further configured to respectively forward the routing policy configured by the SDN controller for the first terminal cell and each of the other terminal cell to a corresponding terminal cell.

In the disclosed embodiment, by receiving a routing policy configured by the SDN controller for the base station, the base station can communicate with the network side server based on an optimized route assigned by the SDN controller (the SDN controller can comprehensively integrate global topology and configure an optimal route for the base station), thereby improving routing efficiency between the base station and the network side server. Moreover, by respectively forwarding the routing policy configured by the SDN controller for the first terminal cell and each of the other terminal cell to a corresponding terminal cell, the first and the at least one second terminal cell may communicate with the base station based on an optimized route configured by the SDN controller (the SDN controller can comprehensively integrate global topology and flexibly configure optimal routing for each of the terminal cells), thereby enhancing the data transmission efficiency between the terminal cells and the base station.

Moreover, a seventh aspect of the instant disclosure provides a SDN controller, which may include the bandwidth sharing device as set forth in the forth aspect of the instant disclosure.

Moreover, an eighth aspect of the instant disclosure provides a terminal cell, which my include the bandwidth sharing device as set forth in the fifth aspect of the instant disclosure.

Moreover, a ninth aspect of the instant disclosure provides a base station, which may include the bandwidth-sharing device as set forth in the sixth aspect of the instant disclosure.

Through the disclosed embodiments, a SDN controller may be enabled to bundle the bandwidth resources of multiple T-SCs on the backhaul link for high-bandwidth services. The disclosed bandwidth-sharing scheme may ensure that the wireless backhaul sharing mechanism between T-SCs can be applied, thereby achieving flexible configuration of bandwidth resources on the backhaul link.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

The present disclosure will be further described in detail below with reference to the drawings and specific embodiments. It should be noted that the embodiments in the present application and the features in various embodiments may be combined with each other given no specific indication of conflicts.

In the following description, numerous specific details are set forth in order to provide a thorough understanding of the inventive concept of the disclosure, but the inventive concept may be practiced in embodiments other than what is described herein. Therefore, it should be understood that the scope of the instant disclosure should not be narrowly limited to the specifically disclosure embodiments.

Figure 1:
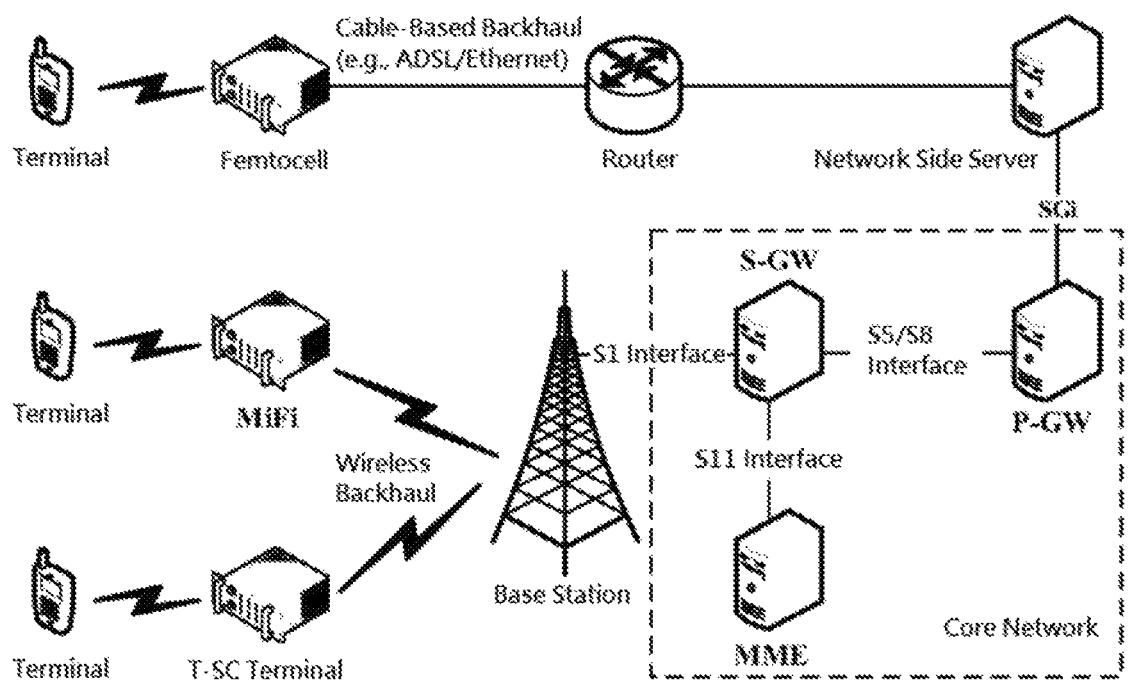
FIG. 1 shows a network architecture diagram that illustrates comparison between three types of Small Cell solutions.
Figure 2:
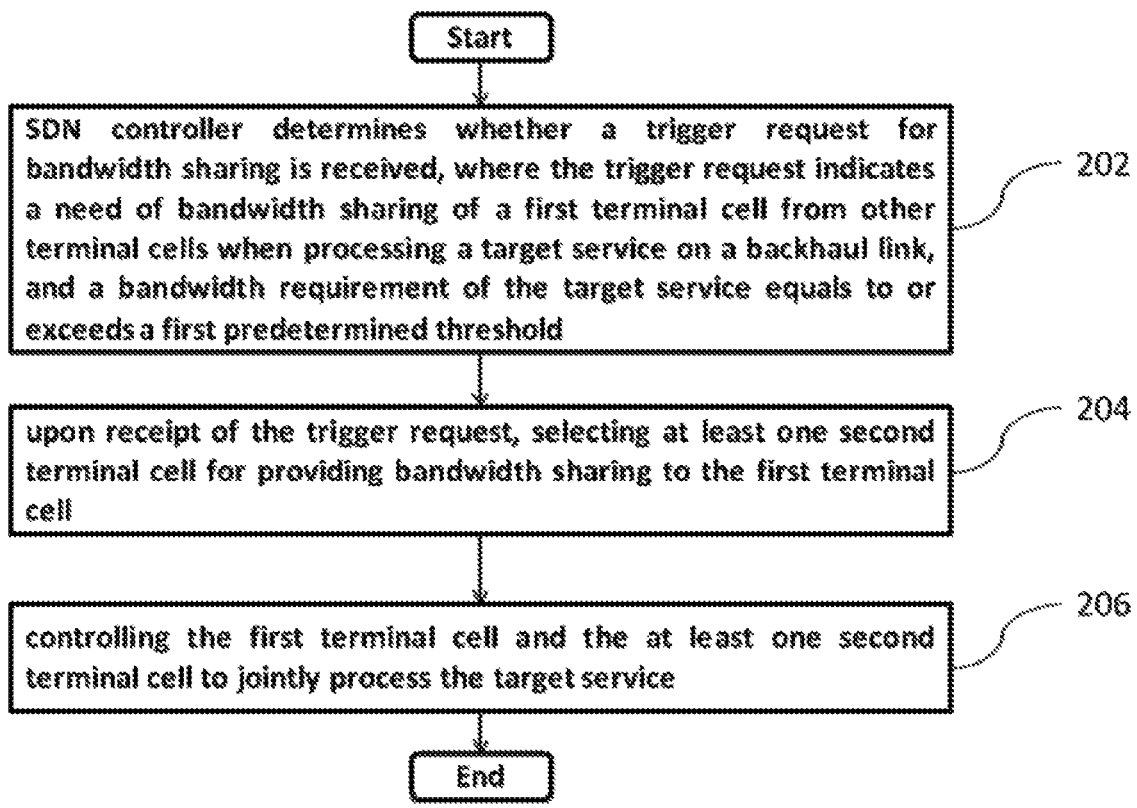
FIG. 2 is a schematic flow chart showing a method for bandwidth sharing of a terminal cell based on SDN control according to a first embodiment of the present disclosure.

FIG. 2 is a schematic flow chart showing a method for bandwidth sharing of a terminal cell based on SDN control according to a first embodiment of the present disclosure.

As shown in FIG. 2, a bandwidth sharing method based on SDN control of terminal cell in accordance with a first embodiment of the instant disclosure comprises:

process 202, in which a SDN controller determines whether a trigger request for bandwidth sharing is received, where the trigger request indicates a need of bandwidth sharing of a first terminal cell from other terminal cells when processing a target service on a backhaul link, and a bandwidth requirement of the target service equals to or exceeds a first predetermined threshold;

process 204, upon receipt of the trigger request, selecting at least one second terminal cell for providing bandwidth sharing to the first terminal cell; and process 206, controlling the first terminal cell and the at least one second terminal cell to jointly process the target service.

In the exemplary embodiment, the SDN controller selects at least one terminal cell (e.g., one or more second terminal cells) to provide bandwidth sharing to the to any one of the foregoing terminal cells (e.g., the first terminal cell) when receiving a trigger request for shared bandwidth, thus controlling the first terminal cell and the at least one selected second terminal cell to jointly process a target service. As such, the SDN controller can bundle the bandwidth resources of multiple T-SCs on the backhaul link for services that impose high bandwidth requirements (i.e., for target services whose bandwidth requirement equals to or exceeds a first predetermined threshold). The disclosed bandwidth-sharing scheme may therefore ensure that the wireless backhaul sharing mechanism between T-SCs can be applied, thereby achieving flexible configuration of bandwidth resources on the backhaul link.

In the exemplary embodiment, the process of controlling the first and the second terminal cell to jointly process the target service specifically includes: respectively configuring a service data routing policy for each of the second terminal cell and the first terminal cell; transmitting the respective routing policy of the first terminal cell and the second terminal cell to a base station that provides backhaul link to the first and the second terminal cells, wherein the base station respectively forwards the routing policy to a corresponding terminal cell, so as to enable joint routing of the service data of the target service to the base station based on the respectively configured routing policy.

In the exemplary embodiment, by configuring a routing policy to each of the first terminal cell and the at least one second terminal cells, the SDN controller can comprehensively integrate a global topology into any of the foregoing terminal cells and configure an optimal route for each of the terminal cells, so as to improve data transmission efficiency between the terminal cells and the base station.

Specifically, the routing policy provided to the terminal cells may be configured in accordance to the state information of the terminal cell, the path information between the terminal cells, and the path information between the terminal cell and the base station. The status information of the terminal cell may include address information, energy consumption information, and available bandwidth information. The path information between the terminal cells may include path delay information and path cost information. The path information between the terminal cells and the base station may include path delay information and path cost information.

In any one of the foregoing embodiments, the bandwidth-sharing method may further include: configuring a routing policy to the network side server for the base station; and sending the routing policy to the network side server to the base station, so as to enable the base station to route the service data to the network side service according to the allocated routing policy.

In the disclosed embodiment, by configuring a routing policy to the network side server for the base station, the SDN controller can likewise configure an optimal route for the base station based on the integrated global topology, so as to improve data transmission efficiency between the base station and the network side server.

In any one of the foregoing embodiments, the bandwidth-sharing method may further include: determining the number of the second terminal cell based on at least one of capability information of the SDN controller or data characteristics of the target service. The capability information of the SDN controller may include computing capability information.

In any one of the foregoing embodiments, the trigger request may include: available bandwidth information, bandwidth requirement of the target service, and remaining power information of the first terminal cell.

Figure 3:
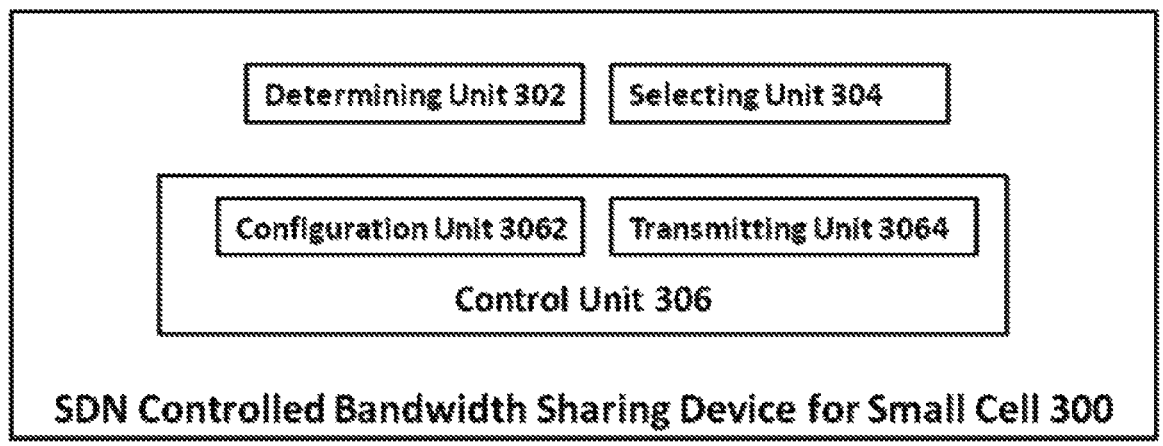
FIG. 3 is a schematic block diagram of a bandwidth sharing device for a terminal cell based on SDN control according to a first embodiment of the present disclosure.

FIG. 3 is a schematic block diagram of a bandwidth sharing device for a terminal cell based on SDN control according to a first embodiment of the present disclosure.

As shown in FIG. 3, a bandwidth sharing device 300 of terminal cell based on SDN control in accordance with one embodiment of the instant disclosure, which is applicable in a SND controller, comprises: a determining unit 302, a selecting unit 304, and a control unit 306.

The determining unit is configured to determine whether a trigger request for bandwidth sharing is received. The trigger request indicates a need of bandwidth sharing of a first terminal cell from other terminal cells when processing a target service on a backhaul link, and a bandwidth requirement of the target service equals to or exceeds a first predetermined threshold. The selecting unit is configured to select one or more second terminal cells to provide bandwidth sharing for the first terminal cell upon determining receipt of the trigger request. The control unit is configured to control the first terminal cell and the one or more second terminal cells to jointly process the target service.

In the exemplary embodiment, the SDN controller selects at least one terminal cell (e.g., one or more second terminal cells) to provide bandwidth sharing to the to any one of the foregoing terminal cells (e.g., the first terminal cell) when receiving a trigger request for shared bandwidth, thus controlling the first terminal cell and the at least one selected second terminal cell to jointly process a target service. As such, the SDN controller can bundle the bandwidth resources of multiple T-SCs on the backhaul link for services that impose high bandwidth requirements (i.e., for target services whose bandwidth requirement equals to or exceeds a first predetermined threshold). The disclosed bandwidth-sharing scheme may therefore ensure that the wireless backhaul sharing mechanism between T-SCs can be applied, thereby achieving flexible configuration of bandwidth resources on the backhaul link.

In the exemplary embodiment, the control unit 306 includes: a configuration unit 3062, which is configured to respectively configure a service data routing policy for each of the second terminal cell and the first terminal cell; a transmitting unit 3064, which is configured to transmit the respective routing policy (configured by the configuration unit 3062) for the first terminal cell and the second terminal cell to a base station that provides backhaul link to the first and the second terminal cells. The base station respectively forwards the routing policy to a corresponding terminal cell, so as to enable joint routing of the service data of the target service to the base station based on the respectively configured routing policy.

In the exemplary embodiment, by configuring a routing policy to each of the first terminal cell and the at least one second terminal cells, the SDN controller can comprehensively integrate a global topology into any of the foregoing terminal cells and configure an optimal route for each of the terminal cells, so as to improve data transmission efficiency between the terminal cells and the base station.

Specifically, the routing policy provided to the terminal cells may be configured in accordance to the state information of the terminal cell, the path information between the terminal cells, and the path information between the terminal cell and the base station. The status information of the terminal cell may include address information, energy consumption information, and available bandwidth information. The path information between the terminal cells may include path delay information and path cost information. The path information between the terminal cells and the base station may include path delay information and path cost information.

In anyone of the foregoing embodiments, the configuration unit 3062 is further configured to: configure a routing policy to the network side server for the base station. The transmitting unit 3064 is further configured to: transmitting the routing policy to the network side server (configured by the configuration unit 3062) for the base station to the base station, so as to enable joint routing of the service data of the target service to the base station based on the respectively configured routing policy.

In the exemplary embodiment, by configuring a routing policy to the network side server for the base station, the SDN controller can likewise configure an optimal route for the base station based on the integrated global topology, so as to improve data transmission efficiency between the base station and the network side server.

In any one of the foregoing embodiments, the selecting unit 304 is further configured to: determine the number of the second terminal cell based on at least one of capability information of the SDN controller or data characteristics of the target service.

In any one of the foregoing embodiments, the trigger request may include: available bandwidth information, bandwidth requirement of the target service, and remaining power information of the first terminal cell.

Figure 4:
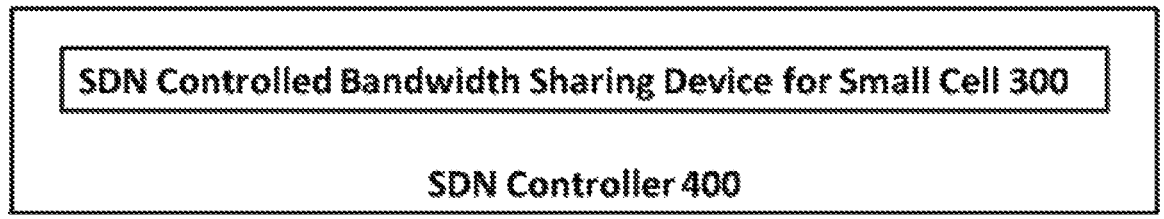
FIG. 4 shows a schematic block diagram of an SDN controller in accordance with an embodiment of the present disclosure.

FIG. 4 shows a schematic block diagram of an SDN controller in accordance with an embodiment of the present disclosure.

As shown in FIG. 4, a SDN controller 400 in accordance with one embodiment of the instant disclosure includes: the bandwidth sharing device 300 of terminal cell based on SDN control as shown in FIG. 3.

Figure 5:
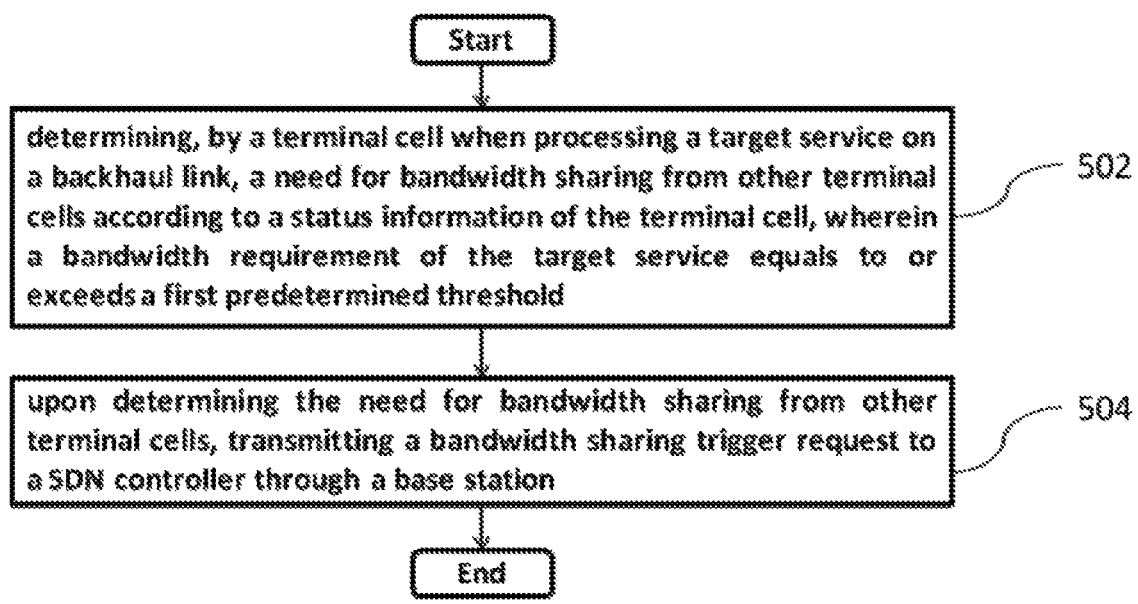
FIG. 5 is a schematic flow chart showing a bandwidth sharing method for a terminal cell based on SDN control according to a second embodiment of the present disclosure.

FIG. 5 is a schematic flow chart showing a bandwidth sharing method for a terminal cell based on SDN control according to a second embodiment of the present disclosure.

As shown in FIG. 5, the method of bandwidth sharing of terminal cell based on SDN control in accordance with a second embodiment of the instant disclosure includes:

process 502, determining, by a terminal cell when processing a target service on a backhaul link, a need for bandwidth sharing from other terminal cells according to a status information of the terminal cell, wherein a bandwidth requirement of the target service equals to or exceeds a first predetermined threshold; and process 504, upon determining the need for bandwidth sharing from other terminal cells, transmitting a bandwidth sharing trigger request to a SDN controller through a base station.

In one embodiment, when a terminal cell processes a high bandwidth service on the backhaul link (i.e., the target service whose bandwidth requirement equals to or exceeds a first predetermined threshold), if a need for bandwidth sharing from other terminal cell(s) is determined, a trigger request for bandwidth-sharing may be sent through the base station to the SDN controller. Accordingly, the SDN controller can select at least one terminal cell (e.g., a second terminal cell) to provide the bandwidth-sharing to any of the above-mentioned terminal cells (e.g., the first terminal cell), so as to control the first terminal cell and the selected at least one second terminal cell to jointly processes the target service. As such, it is ensured that the SDN controller can bundle the bandwidth resources of multiple T-SCs on the backhaul link for services that impose high bandwidth requirements. The disclosed bandwidth-sharing scheme may therefore ensure that the wireless backhaul sharing mechanism between T-SCs can be applied, thereby achieving flexible configuration of bandwidth resources on the backhaul link.

In the exemplary embodiment, the process of determining a need for bandwidth sharing according to a status information of the terminal cell specifically includes: confirming the need for bandwidth sharing from other terminal cells upon at least one of the following conditions: when available bandwidth of the terminal cell is insufficient to meet the bandwidth requirement of the target service; and when remaining power of the terminal cell is lower than a first predetermined power value.

In any one of the foregoing embodiments, the bandwidth sharing method may further include: determining whether an available bandwidth of the terminal cell equals to or exceeds a second predetermined threshold, and determining whether the terminal cell's remaining power equals to or exceeds a second predetermined power value. Upon determining that the available bandwidth equals to or exceeds the second predetermined threshold, and the remaining power equals to or exceeds the second predetermined power value, the method further includes: transmitting an information of the terminal cell to the SDN controller through the base station, so as to enable the SDN controller to determine whether to select the terminal cell for providing bandwidth sharing to other terminal cells.

In the exemplary embodiment, when a terminal cells have more available bandwidth (i.e., having bandwidth equals to or exceeds a second predetermined threshold), and the remaining power is also sufficient (i.e., greater than or equal to a second predetermined power value), the available terminal cell may send its own information to the SDN, controller so that the SDN controller may determine whether to select the available terminal cell for providing bandwidth sharing to other terminal cells.

Figure 6:
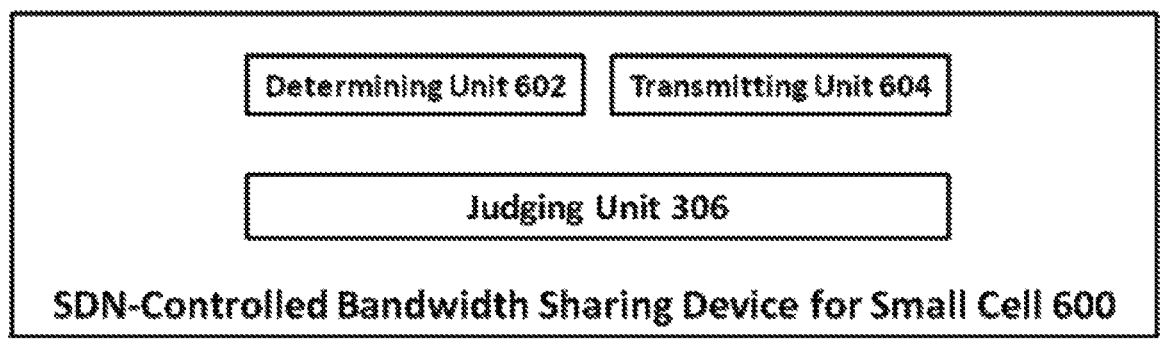
FIG. 6 is a schematic block diagram of a SDN-controlled bandwidth sharing device for a terminal cell according to a second embodiment of the present disclosure.

FIG. 6 is a schematic block diagram of a SDN-controlled bandwidth sharing device for a terminal cell according to a second embodiment of the present disclosure.

As shown in FIG. 6, a bandwidth sharing device 600 of terminal cell based on SDN control, which is applicable in a terminal cell, includes: a determining unit 602 configured to determine a need for bandwidth sharing from other terminal cells according to a status information of the terminal cell processing a target service on a backhaul link, wherein a bandwidth requirement of the target service equals to or exceeds a first predetermined threshold; and a transmitting unit 604 configured to transmit a bandwidth sharing trigger request to a SDN controller through a base station upon determining the need for bandwidth sharing from other terminal cells.

In one embodiment, when a terminal cell processes a high bandwidth service on the backhaul link (i.e., the target service whose bandwidth requirement equals to or exceeds a first predetermined threshold), if a need for bandwidth sharing from other terminal cell(s) is determined, a trigger request for bandwidth-sharing may be sent through the base station to the SDN controller. Accordingly, the SDN controller can select at least one terminal cell (e.g., a second terminal cell) to provide the bandwidth-sharing to any of the above-mentioned terminal cells (e.g., the first terminal cell), so as to control the first terminal cell and the selected at least one second terminal cell to jointly processes the target service. As such, it is ensured that the SDN controller can bundle the bandwidth resources of multiple T-SCs on the backhaul link for services that impose high bandwidth requirements. The disclosed bandwidth-sharing scheme may therefore ensure that the wireless backhaul sharing mechanism between T-SCs can be applied, thereby achieving flexible configuration of bandwidth resources on the backhaul link.

In the exemplary embodiment, the determining unit 602 is further configured to: confirm the need for bandwidth sharing from other terminal cells upon at least one of the following conditions: when available bandwidth of the terminal cell is insufficient to meet the bandwidth requirement of the target service, and when remaining power of the terminal cell is lower than a first predetermined power value.

In any one of the foregoing embodiments, the bandwidth sharing device may further include: a judging unit 606 configured to determine whether an available bandwidth of the terminal cell equals to or exceeds a second predetermined threshold, and determining whether the terminal cell's remaining power equals to or exceeds a second predetermined power value. The transmitting unit 604 may be further configured to: transmit an information of the terminal cell to the SDN controller through the base station upon determining that the available bandwidth equals to or exceeds the second predetermined threshold and the remaining power equals to or exceeds the second predetermined power value, so as to enable the SDN controller to determine whether to select the terminal cell for providing bandwidth sharing to other terminal cells.

In the exemplary embodiment, when a terminal cells have more available bandwidth (i.e., having bandwidth equals to or exceeds a second predetermined threshold), and the remaining power is also sufficient (i.e., greater than or equal to a second predetermined power value), the available terminal cell may send its own information to the SDN, controller so that the SDN controller may determine whether to select the available terminal cell for providing bandwidth sharing to other terminal cells.

Figure 7:
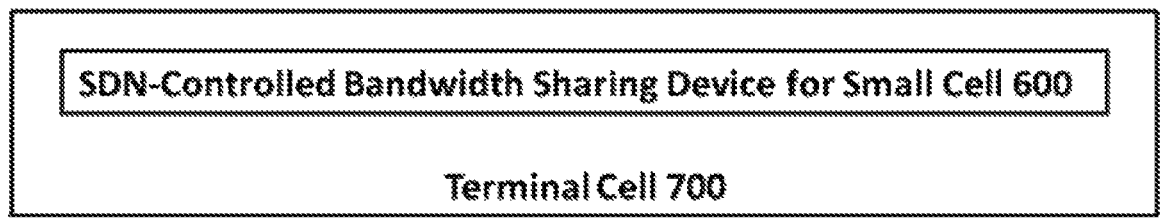
FIG. 7 shows a schematic block diagram of a terminal cell in accordance with an embodiment of the present disclosure.

FIG. 7 shows a schematic block diagram of a terminal cell in accordance with an embodiment of the present disclosure.

As shown in FIG. 7, a terminal cell 700 in accordance with one embodiment of the instant disclosure may include the bandwidth sharing device 600 of terminal cell based on SDN control as shown in FIG. 6.

Figure 8:
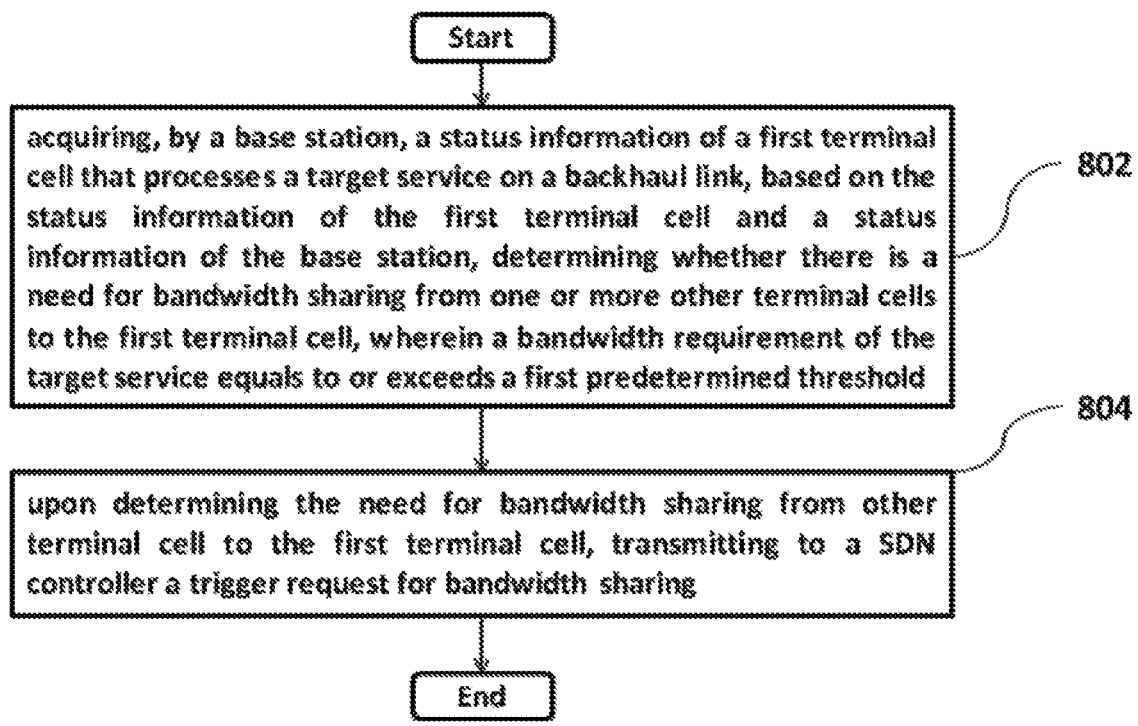
FIG. 8 is a schematic flow chart showing a method for bandwidth sharing based on SDN control of a terminal cell according to a third embodiment of the present disclosure.

FIG. 8 is a schematic flow chart showing a method for bandwidth sharing based on SDN control of a terminal cell according to a third embodiment of the present disclosure.

As shown in FIG. 8, a method for bandwidth sharing of terminal cell based on SDN control includes:

process 802, acquiring, by a base station, a status information of a first terminal cell that processes a target service on a backhaul link, based on the status information of the first terminal cell and a status information of the base station, determining whether there is a need for bandwidth sharing from one or more other terminal cells to the first terminal cell, wherein a bandwidth requirement of the target service equals to or exceeds a first predetermined threshold; and process 804, upon determining the need for bandwidth sharing from other terminal cell to the first terminal cell, transmitting to a SDN controller a trigger request for bandwidth sharing.

In the exemplary embodiment, the base station sends a trigger request for sharing bandwidth to the SDN controller upon determining a need for bandwidth sharing from other terminal cell(s) to a particular terminal cell (e.g., the first terminal cell). Accordingly, the SDN controller can select at least one terminal cell (e.g., a second terminal cell) to provide the bandwidth sharing to any of the above-mentioned terminal cells (e.g., the first terminal cell), so as to control the first terminal cell and the selected at least one second terminal cell to jointly processes the target service. As such, it is ensured that the SDN controller can bundle the bandwidth resources of multiple T-SCs on the backhaul link for services that impose high bandwidth requirements. The disclosed bandwidth-sharing scheme may therefore ensure that the wireless backhaul sharing mechanism between T-SCs can be applied, thereby achieving flexible configuration of bandwidth resources on the backhaul link.

In the exemplary embodiment, the process of determining whether there is a need for bandwidth sharing from one or more other terminal cells to the first terminal cell based on the status information of the first terminal cell and a status information of the base station specifically comprises:

confirming the need for bandwidth sharing from other terminal cells to the first terminal cell when: an available bandwidth of the first terminal cell is insufficient to meet the bandwidth requirement of the target service, and an available bandwidth of the base station is insufficient to be allocated to the first terminal cell, or a cost for the base station to provide bandwidth to the first terminal cell is higher than expected.

In some embodiment, the determination of the cost for the base station to provide bandwidth to the first terminal cell is based on a network status of the base station and a performance requirement of the target service, wherein, the network status includes network capacity and loading, and the performance requirement of the target service includes bandwidth requirement, delay requirement, and quality of service requirement.

It should be noted that, the "cost for the base station to provide bandwidth" described herein mainly considers the high bandwidth, low latency, and high QoS characteristics of the mobile Internet services. If the wireless backhaul of a terminal cell is less than ideal, it may not be able to satisfy the service requirement, and the base station may need to sacrifice network capacity to guarantee the resources of the backhaul link. Therefore, it requires comprehensive consideration for the base station to determine the cost of bandwidth provision.

In any one of the foregoing embodiments, the bandwidth sharing method may further include: determining whether the trigger request for bandwidth sharing is received from the first terminal cell; and upon determining receipt of the trigger request for bandwidth sharing from the first terminal cell, forwarding the trigger request for bandwidth sharing to the SDN controller.

In the exemplary embodiment, the trigger request for bandwidth sharing is sent from the first terminal cell, and the base station acts as a relay device between the terminal cell and the SDN controller.

In anyone of the foregoing embodiments, the bandwidth sharing method may further include: receiving a routing policy respectively configured by the SDN controller for the base station, the first terminal cell, and each of the one or more other terminal cell that provides bandwidth sharing for the first terminal cell; and respectively forwarding the routing policy configured by the SDN controller for the first terminal cell and each of the other terminal cell to a corresponding terminal cell.

In the disclosed embodiment, by receiving a routing policy configured by the SDN controller for the base station, the base station can communicate with the network side server based on an optimized route assigned by the SDN controller (the SDN controller can comprehensively integrate global topology and configure an optimal route for the base station), thereby improving routing efficiency between the base station and the network side server. Moreover, by respectively forwarding the routing policy configured by the SDN controller for the first terminal cell and each of the other terminal cell to a corresponding terminal cell, the first and the at least one second terminal cell may communicate with the base station based on an optimized route configured by the SDN controller (the SDN controller can comprehensively integrate global topology and flexibly configure optimal routing for each of the terminal cells), thereby enhancing the data transmission efficiency between the terminal cells and the base station.

Figure 9:
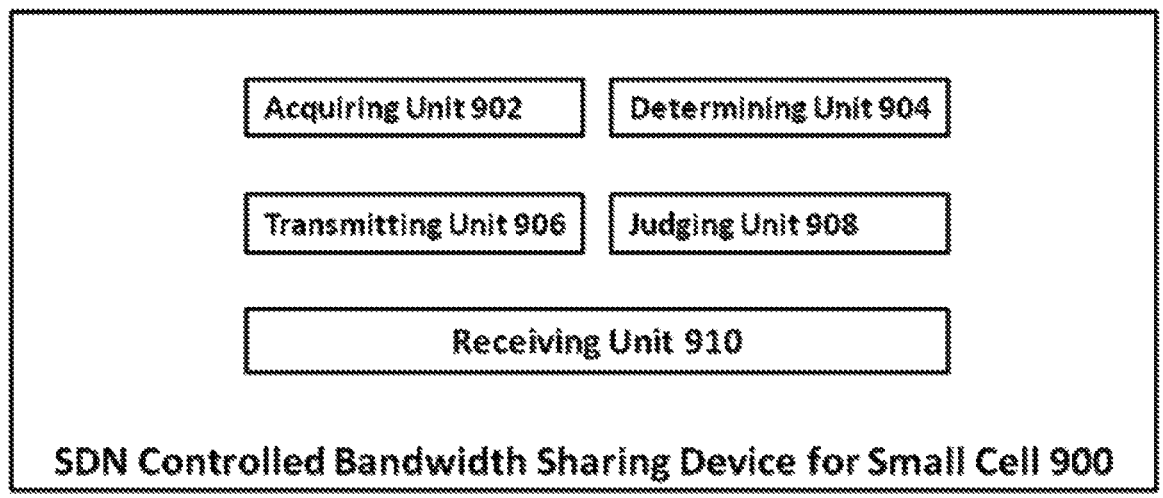
FIG. 9 is a schematic block diagram of a SDN-controlled bandwidth sharing device for a terminal cell according to a third embodiment of the present disclosure.

FIG. 9 is a schematic block diagram of a SDN-controlled bandwidth sharing device for a terminal cell according to a third embodiment of the present disclosure.

As shown in FIG. 9, a bandwidth sharing device 900 for a terminal cell based on SDN control, which is applicable in a base station, includes: an acquiring unit 902, a determining unit 904, and a transmitting unit 906.

Among them, the acquiring unit 902 is configured to acquire a status information of a first terminal cell that processes a target service on a backhaul link, wherein a bandwidth requirement of the target service equals to or exceeds a first predetermined threshold; the determining unit 904 is configured to determine whether there is a need for bandwidth sharing from one or more other terminal cells to the first terminal cell based on the status information of the first terminal cell and a status information of the base station; and the transmitting unit 906 is configured to transmit to a SDN controller a trigger request for bandwidth sharing upon determining the need for bandwidth sharing from other terminal cell to the first terminal cell.

In the exemplary embodiment, the base station sends a trigger request for sharing bandwidth to the SDN controller upon determining a need for bandwidth sharing from other terminal cell(s) to a particular terminal cell (e.g., the first terminal cell). Accordingly, the SDN controller can select at least one terminal cell (e.g., a second terminal cell) to provide the bandwidth sharing to any of the above-mentioned terminal cells (e.g., the first terminal cell), so as to control the first terminal cell and the selected at least one second terminal cell to jointly processes the target service. As such, it is ensured that the SDN controller can bundle the bandwidth resources of multiple T-SCs on the backhaul link for services that impose high bandwidth requirements. The disclosed bandwidth-sharing scheme may therefore ensure that the wireless backhaul sharing mechanism between T-SCs can be applied, thereby achieving flexible configuration of bandwidth resources on the backhaul link.

In the exemplary embodiment, the determining unit 904 is further configured to: confirm the need for bandwidth sharing from other terminal cells to the first terminal cell when: an available bandwidth of the first terminal cell is insufficient to meet the bandwidth requirement of the target service, and an available bandwidth of the base station is insufficient to be allocated to the first terminal cell, or a cost for the base station to provide bandwidth to the first terminal cell is higher than expected.

In some embodiments, the determining unit 904 is further configured to: determine the cost for the base station to provide bandwidth to the first terminal cell based on a network status of the base station and a performance requirement of the target service, wherein the network status includes network capacity and loading, and the performance requirement of the target service includes bandwidth requirement, delay requirement, and quality of service requirement.

It should be noted that, the "cost for the base station to provide bandwidth" described herein mainly considers the high bandwidth, low latency, and high QoS characteristics of the mobile Internet services. If the wireless backhaul of a terminal cell is less than ideal, it may not be able to satisfy the service requirement, and the base station may need to sacrifice network capacity to guarantee the resources of the backhaul link. Therefore, it requires comprehensive consideration for the base station to determine the cost of bandwidth provision.

In anyone of the foregoing embodiments, the bandwidth sharing device may further include: a judging unit 908, which is configured to determine whether the trigger request for bandwidth sharing is received from the first terminal cell. The transmitting unit 906 may be further configured to forward the trigger request for bandwidth sharing to the SDN controller when the judging unit 908 determines the receipt of the trigger request for bandwidth sharing from the first terminal cell.

In the exemplary embodiment, the trigger request for bandwidth sharing is sent from the first terminal cell, and the base station acts as a relay device between the terminal cell and the SDN controller.

In any one of the foregoing embodiments, the bandwidth sharing device may further include: a receiving unit 910 configured to receive a routing policy respectively configured by the SDN controller for the base station, the first terminal cell, and each of the one or more other terminal cell that provides bandwidth sharing for the first terminal cell. The transmitting unit may be further configured to respectively forward the routing policy configured by the SDN controller for the first terminal cell and each of the other terminal cell to a corresponding terminal cell.

In the exemplary embodiment, by receiving a routing policy configured by the SDN controller for the base station, the base station can communicate with the network side server based on an optimized route assigned by the SDN controller (the SDN controller can comprehensively integrate global topology and configure an optimal route for the base station), thereby improving routing efficiency between the base station and the network side server. Moreover, by respectively forwarding the routing policy configured by the SDN controller for the first terminal cell and each of the other terminal cell to a corresponding terminal cell, the first and the at least one second terminal cell may communicate with the base station based on an optimized route configured by the SDN controller (the SDN controller can comprehensively integrate global topology and flexibly configure optimal routing for each of the terminal cells), thereby enhancing the data transmission efficiency between the terminal cells and the base station.

Figure 10:
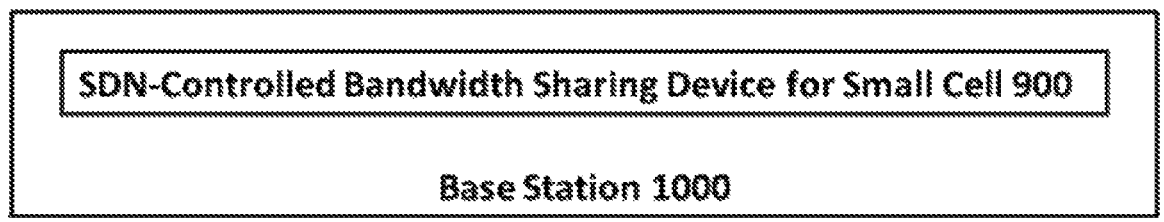
FIG. 10 shows a schematic block diagram of a base station according to an embodiment of the present invention.

FIG. 10 shows a schematic block diagram of a base station according to an embodiment of the present invention.

As shown in FIG. 10, a base station 1000 in accordance with embodiments of the instant disclosure may include: the bandwidth sharing device 900 of small cell based on SDN control as illustrated in FIG. 9.

In summary, embodiments of the present disclosure is mainly based on a T-SC wireless backhaul sharing scheme, and the basic idea is to introduce SDN application in a terminal based on T-SC access-based backhaul selection. Through data plane routing configuration in a T-SC scenario, the backhaul resources of multiple T-SCs may be bundled together and provided for use by a single T-SC, thereby achieving flexible bandwidth configuration.

Figure 11:
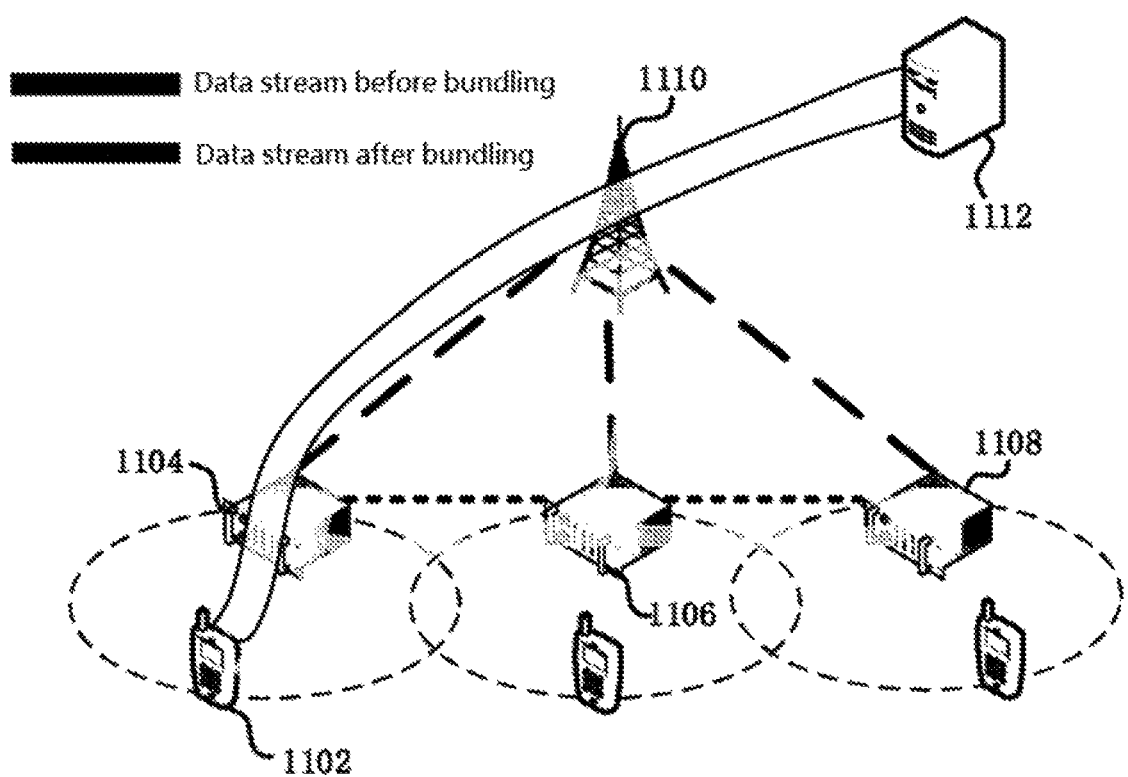
FIG. 11 is a schematic diagram showing a scenario of bandwidth sharing according to an embodiment of the present disclosure.

Specifically, in a mobile environment, backhaul resources of multiple T-SCs can be bundled and provided for use by a high-bandwidth service (such as VR/AR/VHD) in a T-SC, i.e., the data plane routing of the shared bandwidth of these T-SCs for high bandwidth services. As shown in FIG. 11, before bandwidth bundling, the data stream of the terminal 1102 reaches the base station 1110 through the T-SC 1104, and then reaches the network side server 1112. After the bandwidth is bundled, i.e., after bandwidth sharing, the data stream of the high bandwidth service (of the terminal 1102) reaches T-SC 1104 from the terminal 1102, and is then divided into three parts (using the bundling of 3 T-SC bandwidth as example): part 1 arrives at the base station 1110 through the T-SC 1104, and then reaches the network side server 1112; part 2 arrives at T-SC 1106 through T-SC 1104, then arrives at base station 1110 through T-SC 1106, and then arrives at network side server 1112; part 3 arrives at T-SC 1108 through T-SC 1104 and then arrives at the base station 1110 through T-SC 1108, and then reaches the network side server 1112.

The specific implementation process of the present disclosure is described in detail below.

The present disclosure contemplates that in a wireless environment, if there is a certain T-SC having insufficient bandwidth and/or insufficient power to support high bandwidth services, and there are some T-SC having surpluses bandwidth and sufficient power, then it is possible to share the bandwidth of these bandwidth-rich and fully-charged T-SCs for high-bandwidth service data plane routing of T-SCs with those having insufficient bandwidth or insufficient current to meet the needs of high-bandwidth services. This bandwidth bundling (i.e., bandwidth sharing) process may be a T-SC triggered process, or an eNB (base station) triggered process, which will be respectively described below.

Figure 12:
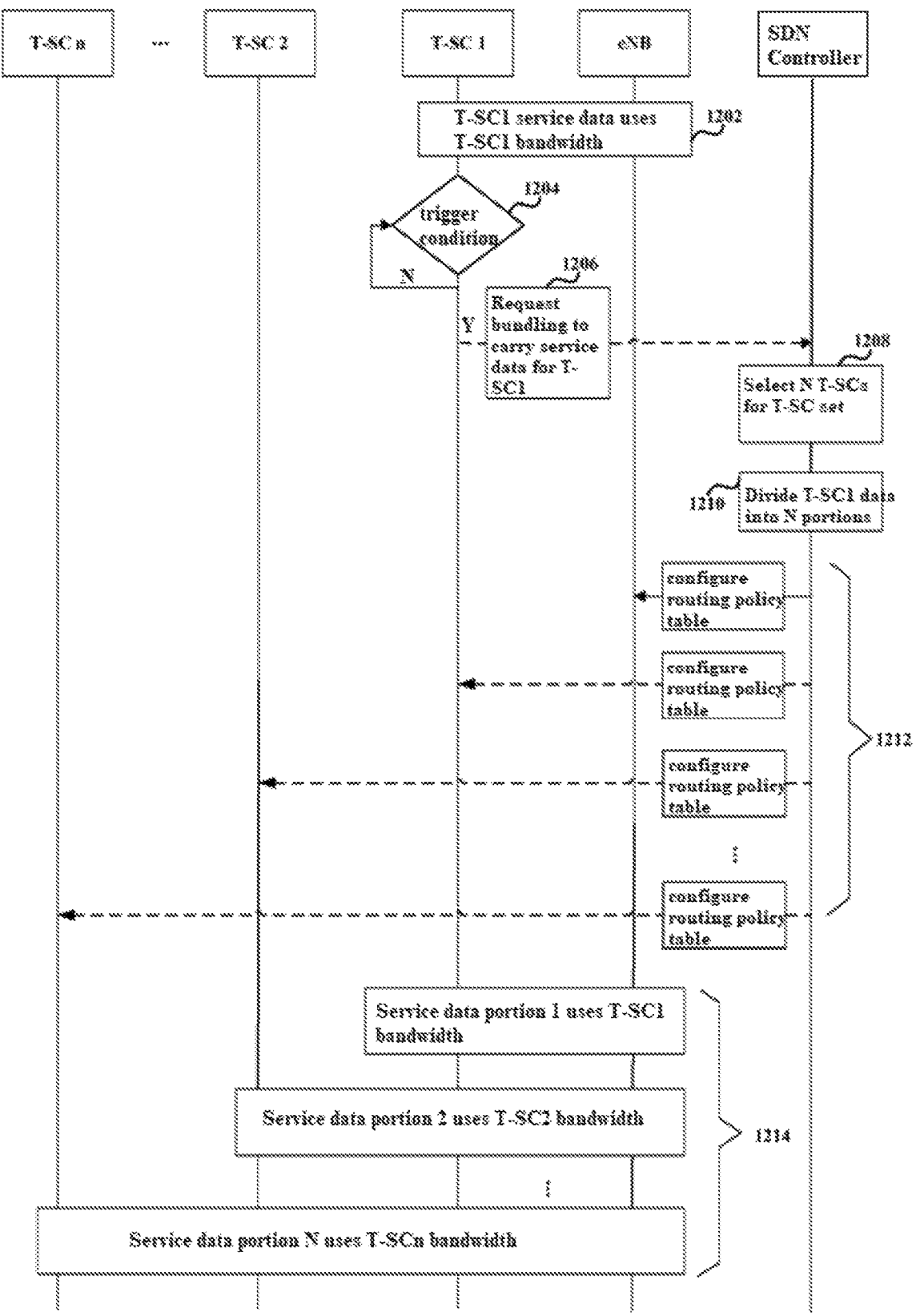
FIG. 12 is a flow chart showing T-SC triggered bandwidth sharing process according to an embodiment of the present disclosure.

1. T-SC trigged bundling process, as shown in FIG. 12, which includes the following processes.

Process 1202: In the initial state, a certain T-SC (e.g., T-SC1 shown in FIG. 12) uses only its own bandwidth for service data stream transmission.

Process 1204: T-SC 1 determines whether the condition for triggering the bandwidth bundling is met. If yes, the method proceeds to process 1206.

Process 1206: when T-SC 1 determines that the triggering condition for bandwidth bundling is met, the SDN controller is requested to configure the bundling bandwidth to carry the service information of T-SC 1.

The condition for triggering bandwidth bundling may be determined based on the T-SC's own status information (e.g., service bandwidth, available bandwidth, energy consumption state, etc.). For example, when T-SC 1 processes high-bandwidth services (that is, service bandwidth exceeds a certain threshold), and its available bandwidth is insufficient to support high-bandwidth services, or when the power of T-SC 1 is low, bandwidth bundling can be triggered to utilize available nearby T-SC backhaul resources for transmitting the service data thereof.

Moreover, the request signal for triggering the bandwidth bundling is sent by T-SC 1 to the eNB, and then forwarded by the eNB to the SDN controller, which is similar to the NAS (Non-Access Stratum) signaling that reaches the MME (Mobility Management Entity). The request signal carries certain necessary information for bandwidth bundling, including the service bandwidth of T-SC 1, the remaining power, and available bandwidth, etc.

Process 1208: after receiving the request of the T-SC 1, the SDN controller calculates a T-SC set from a global optimal perspective. The T-SC set includes a total of N terminal cells (including T-SC 1 itself and N−1 other cells), which jointly provide bandwidth bundling for T-SC 1.

The size of the T-SC set, i.e., N (which is an integer≥2), can be selected based on different criteria, such as the computing power of the SDN controller (N cannot be too large), and the data characteristics of the high-bandwidth service itself (e.g., virtual reality VR data transmission can be divided into basic portion and enhanced portion, which can be routed through different chosen T-SCs), etc.

Process 1210: the SDN controller splits the service data of the T-SC 1 into N portions.

Process 1212: the SDN controller configures a routing policy of the service data, and sends the routing policy to the N T-SCs of the eNB and the T-SC set (e.g., T-SC 1, T-SC 2, . . . T-SCn as shown in FIG. 12).

The routing policy signaling sent by the SDN controller to the eNB reaches the eNB directly. The routing policy signaling sent by the SDN controller to the T-SC, on the other hand, is forwarded by the eNB (similar to NAS signaling).

Process 1214: the corresponding T-SC and the eNB sequentially execute the routing table, and portions of the data stream of the high bandwidth service can be transmitted through the bandwidth of different T-SCs.

Figure 13:
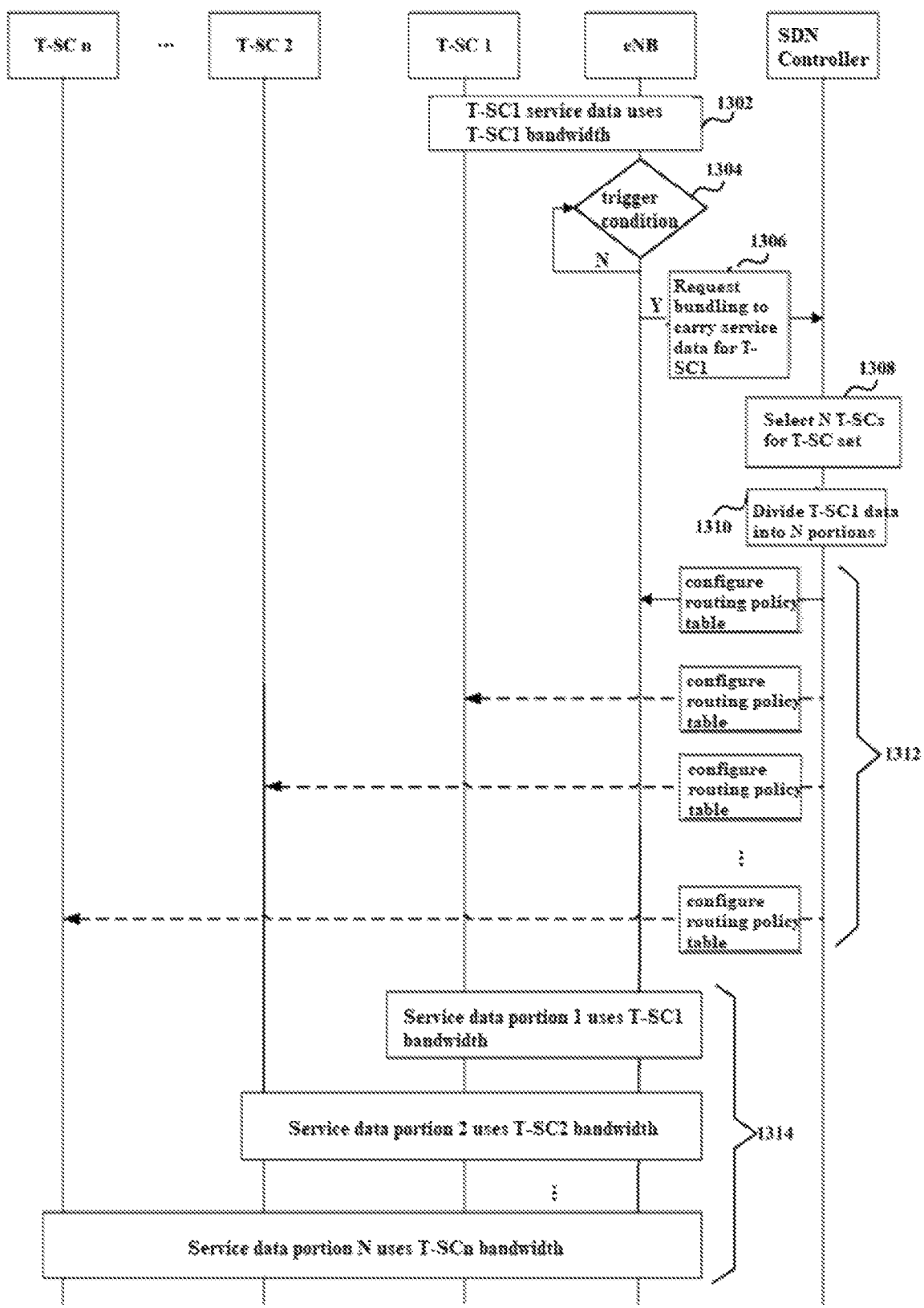
FIG. 13 is a flow chart showing eNB triggered bandwidth sharing process according to an embodiment of the present disclosure.

2. eNB triggered bandwidth bundling process, as shown in FIG. 13, which includes the following processes.

Process 1302: in the initial state, a certain T-SC (e.g., T-SC1 as shown in FIG. 13) uses only its own bandwidth for service data stream transmission.

Process 1304: the eNB determines whether the condition for triggering bandwidth bundling is met. If yes, the method proceeds to process 1306.

Process 1306: when the eNB determines that the triggering bandwidth bundling condition is met, the SDN controller is requested to configure bandwidth bundling to carry the service information of the T-SC 1.

The condition for triggering bandwidth bundling may be determined based on the eNB's own status information (e.g., Uu link bandwidth allocation status, bandwidth provision cost, etc.). For example, when the available bandwidth of the T-SC 1 cannot meet the requirements of high-bandwidth services, and the available bandwidth of the base station is insufficient to be allocated to the T-SC 1, or when the cost of bandwidth provision of the eNB is too high, bandwidth bundling can be triggered to utilize nearby available T-SC backhaul resources for transmitting the service data thereof or reducing the cost of bandwidth provision.

Moreover, the request signal for triggering the bandwidth bundling is sent by eNB directly to the SDN controller. The request signal carries certain necessary information for bandwidth bundling, including the service bandwidth of T-SC 1, the remaining power, and available bandwidth, etc.

Process 1308: after receiving the request of the eNB, the SDN controller calculates a T-SC set from a global optimal perspective for T-SC 1. The T-SC set includes a total of N terminal cells (including T-SC 1 itself and N−1 other cells), which jointly provide bandwidth bundling for T-SC 1.

The size of the T-SC set, i.e., N (which is an integer≥2), can be selected based on different criteria, such as the computing power of the SDN controller (N cannot be too large), and the data characteristics of the high-bandwidth service itself (e.g., virtual reality VR data transmission can be divided into basic portion and enhanced portion, which can be routed through different chosen T-SCs), etc.

Process 1310: the SDN controller splits the service data of the T-SC 1 into N portions.

Process 1312: the SDN controller configures a routing policy of the service data, and sends the routing policy to the N T-SCs of the eNB and the T-SC set (e.g., T-SC 1, T-SC 2, . . . T-SCn as shown in FIG. 13).

The routing policy signaling sent by the SDN controller to the eNB reaches the eNB directly. The routing policy signaling sent by the SDN controller to the T-SC, on the other hand, is forwarded by the eNB (similar to NAS signaling).

Process 1314: the corresponding T-SC and the eNB sequentially execute the routing table, and portions of the data stream of the high bandwidth service can be transmitted through the bandwidth of different T-SCs.

Figure 14:
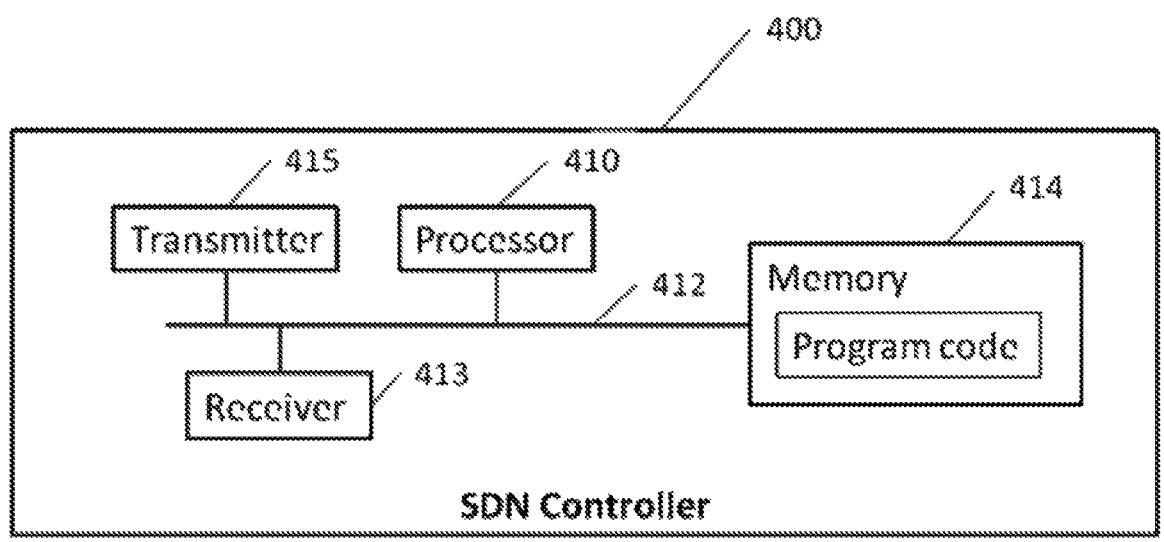
FIG. 14 shows a schematic block diagram of a SDN controller in accordance with another embodiment of the present disclosure.

FIG. 14 shows a schematic block diagram of a SDN controller in accordance with another embodiment of the present disclosure.

As shown in FIG. 14, the SDN controller 400 in accordance with embodiments of the present disclosure includes at least one processor 410, such as a CPU, at least one receiver 413, at least one memory 414, at least one transmitter 415, and at least one communication bus 412. The communication bus 412 is configured to implement communication connection between the abovementioned components. The receiver 413 and the transmitter 415 may be wireless receiving/transmitting devices, e.g., antenna devices, which are responsible for receiving and transmitting mobile signals. The memory 414 may be a high speed RAM or non-volatile memory devices such as at least one disk memory.

The processor 410, e.g., including each of the functional units as described above, such as the determining unit 302, the selecting unit 304, and the Control unit 306, may execute an operating system of the SDN controller 400 and various installed applications, program codes, and the like.

The memory 414 contains program code stored therein. The processor 410 can access the program code stored in the memory 414 via the communication bus 412 to perform the corresponding functions. For example, the various units (e.g., the determining unit 302, the selecting unit 304, the control unit 306, etc.) described in FIG. 3 may be program codes stored in the memory 414, which, when executed, cause the processor 410 to implement the functions of the various functional units, thereby enabling the bandwidth sharing method in accordance with the instant disclosure.

In one embodiment of the instant disclosure, the memory 414 stores a plurality of instructions executable by the processor 410 to implement a bandwidth sharing method. Specifically, the processor 410 determines whether a trigger request for bandwidth sharing is received. The trigger request indicates that a particular terminal cell (e.g., a first terminal cell, T-SC1) requests bandwidth sharing form other terminal cells (e.g., a second terminal cell, T-SC2) when processing a target service on the backhaul link, and the bandwidth requirement of the target service is greater than or equal to a first predetermined threshold. Upon determining the receipt of the trigger request, the processor 410 selects at least one terminal cell (e.g., a second terminal cell) for providing bandwidth sharing to the particular terminal cell (e.g., the first terminal cell). The processor 410 then controls the first terminal cell and the at least one second terminal cell to jointly process the target service.

In a further embodiment, the processor 410 respectively configures a routing policy of the service data for each of the first terminal cell and the one or more second terminal cells. In addition, it respectively transmits the routing policies configured for the first and second terminal cells to the base station that provides backhaul link to the first and second terminal cells. The base station respectively forwards the routing policy to a corresponding terminal cell, so as to enable joint routing of the service data of the target service to the base station based on the respectively configured routing policy.

In a further embodiment, the processor 410 determines the number of the second terminal cell based on at least one of capability information of the SDN controller or data characteristics of the target service.

In a further embodiment, the trigger request may include: available bandwidth information, bandwidth requirement of the target service, and remaining power information of the first terminal cell.

For the brevity of disclosure, the specific implementation of the abovementioned instructions by the processor 410 may refer back to the corresponding embodiments illustrated in FIG. 2, and will not be repeated herein.

Figure 15:
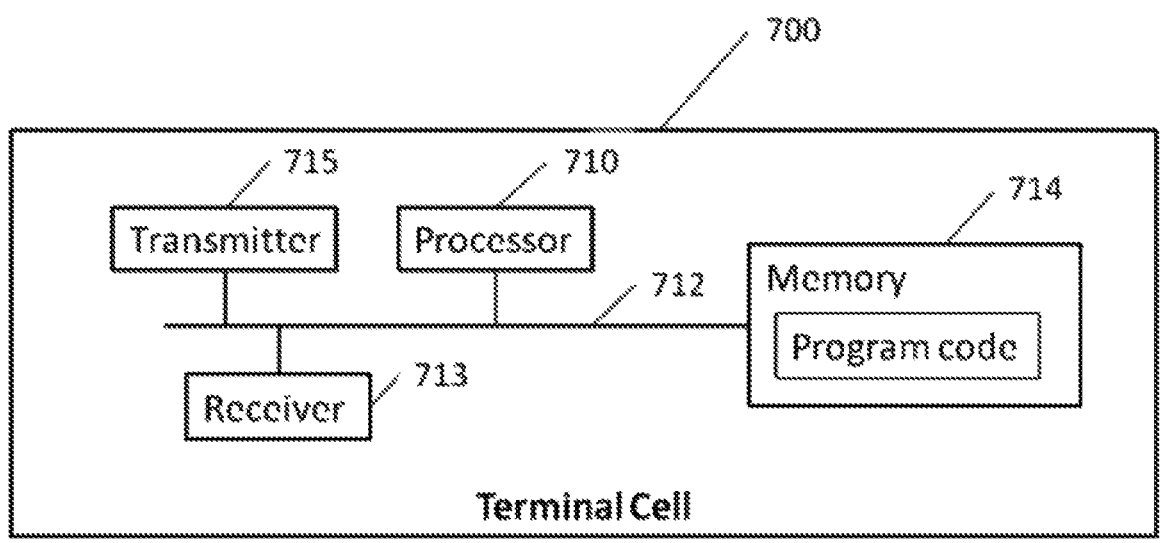
FIG. 15 shows a schematic block diagram of a terminal cell in accordance with another embodiment of the present disclosure.

FIG. 15 shows a schematic block diagram of a terminal cell in accordance with another embodiment of the present disclosure.

FIG. 15 is a schematic block diagram of a terminal cell 700 in accordance with another embodiment of the instant disclosure. The exemplary terminal cell 700 in this embodiment includes at least one processor 710, such as a CPU; at least one receiver 713, at least one memory 714, at least one transmitter 715, and at least one communication bus 712.

The communication bus 712 is configured to implement communication connection between the abovementioned components. The receiver 713 and the transmitter 715 may be wireless receiving/transmitting devices, e.g., an antenna device, which are responsible for receiving and transmitting mobile signals. The memory 714 may be a high speed RAM memory or a non-volatile memory such as at least one disk memory.

The processor 710 (e.g., each of the functional unites described above, including the determining unit 602, the transmitting unit 604, and the judging unit 606, etc.) may execute an operating system of the terminal cell 700 and various installed application programs, program codes, and the like.

The memory 714 contains program code stored therein. The processor 710 can access the program code stored in the memory 714 via the communication bus 712 to perform the corresponding functions. For example, the various units (e.g., the determining unit 602, the transmitting unit 604, the judging unit 606, etc.) described in FIG. 6 may be program codes stored in the memory 714, which, when executed, cause the processor 710 to implement the functions of the various functional units, thereby enabling the bandwidth sharing method in accordance with the instant disclosure.

In one embodiment of the instant disclosure, the memory 714 stores a plurality of instructions executable by the processor 710 to implement a bandwidth sharing method. Specifically, when a first terminal cell is processing a target service on the backhaul link, the processor 710 determines, according to a status information of the first terminal cell, whether there is a need for bandwidth sharing from other terminal cells (e.g., whether the bandwidth requirement of the target service is greater than or equal to a first predetermined threshold). When it is determined that there is a need for bandwidth sharing from other terminal cells, the processor 710 sends a trigger request for bandwidth sharing to the SDN controller through the base station.

In a further embodiment, when the available bandwidth of a first terminal cell cannot meet the bandwidth requirement of the target service, and/or the remaining power of the first terminal cell is lower than the first predetermined power value, the processor 710 may determine that there is a need for bandwidth sharing from other terminal cells.

In a further embodiment, the processor 710 determines whether the available bandwidth of a first terminal cell is greater than or equal to a second predetermined threshold, and determines whether the remaining power thereof is greater than or equal to the second predetermined power value. When it is determined that the available bandwidth of the first terminal cell is greater than or equal to the second predetermined threshold, and the remaining power thereof is greater than or equal to the second predetermined power value, the processor 710 may send the status information of the first terminal cell to the SDN controller through the base station, so as to enable the SDN controller to determine whether to select the first terminal cell for providing bandwidth sharing to other terminal cells.

For the brevity of disclosure, the specific implementation of the abovementioned instructions by the processor 710 may refer back to the corresponding embodiments illustrated in FIG. 5, and will not be repeated herein.

Figure 16:
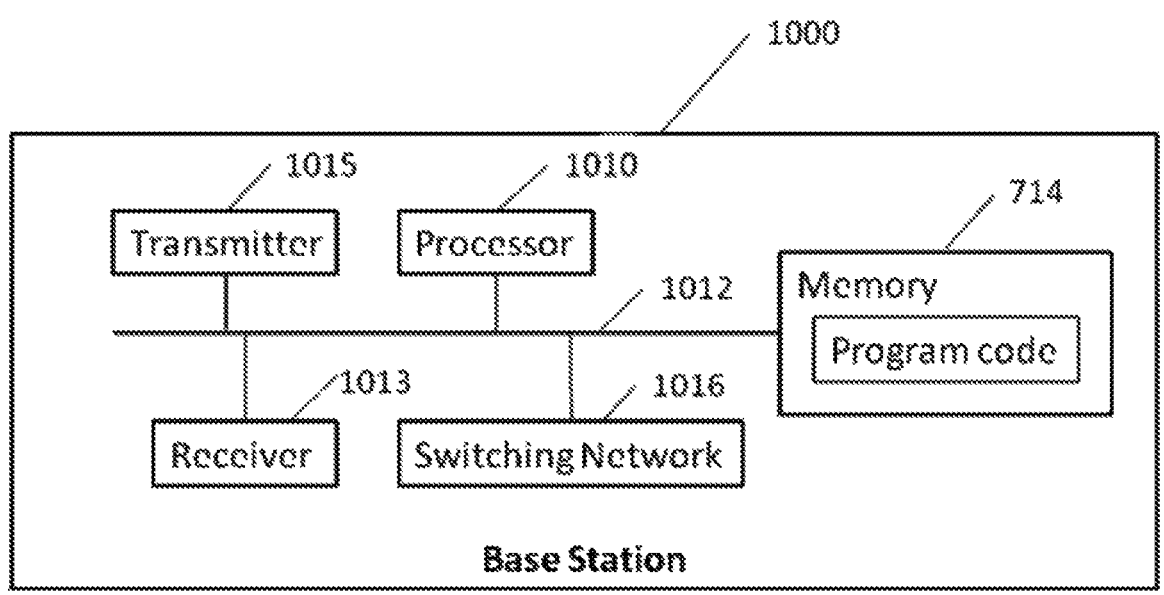
FIG. 16 shows a schematic block diagram of a base station according to another embodiment of the present disclosure.

FIG. 16 shows a schematic block diagram of a base station according to another embodiment of the present disclosure.

FIG. 16 is a schematic block diagram of a base station 1000 in accordance with another embodiment of the present disclosure. The exemplary base station 1000 in this embodiment includes: at least one common processor 1010, such as CPR; at least one receiver 1013; at least one memory 1014; at least one transmitter 1015; at least one communication bus 1012; and at least one switching network 1016. The communication bus 1012 is configured to implement communication connection between the abovementioned components. The receiver 1013 and the transmitter 1015 may be wireless receiving/transmitting devices, e.g., an antenna device, which are responsible for receiving and transmitting mobile signals. The memory 1014 may be a high speed RAM memory or a non-volatile memory such as at least one disk memory. The switching network 1016 may complete internal exchange of data and voice traffic channels between interfaces.

The processor 1010 (which may include each of the functional units described above, e.g., the acquiring unit 902, the determining unit 904, the transmitting unit 906, the judging unit 908, and the like) may execute an operating system of the base station 1000 and various installed application programs, program codes, and the like.

The memory 1014 contains program code stored therein. The processor 1010 can access the program code stored in the memory 1014 via the communication bus 1012 to perform the corresponding functions. For example, the various units (e.g., the acquiring unit 902, the determining unit 904, the transmitting unit 906, the judging unit 908, etc) described in FIG. 6 may be program codes stored in the memory 1014, which, when executed, cause the processor 1010 to implement the functions of the various functional units, thereby enabling the bandwidth sharing method in accordance with the instant disclosure.

In one embodiment, the memory 1014 stores a plurality of instructions that are executable by the processor 1010 to implement a bandwidth sharing method. Specifically, the processor 1010 acquires status information of a first terminal cell that processes a target service on the backhaul link, and determines whether there is a need for bandwidth sharing from other terminal cells to the first terminal cell according to the status information of the first terminal cell and a status information of the base station itself. (e.g., when the bandwidth requirement of the target service is greater than or equal to a first predetermined threshold). Upon determining a need for bandwidth sharing from other terminal cells to the first terminal cell, the processor 1010 sends a trigger request for bandwidth sharing to the SDN controller.

In a further embodiment, when the available bandwidth of the first terminal cell cannot meet the bandwidth requirement of the target service, and the available bandwidth of the base station is insufficient to be allocated to the first terminal cell, or When a cost of bandwidth provision to the first terminal cell by the base station is higher than expected, the processor 1010 may determine a need for bandwidth sharing for the first terminal cell from other terminal cells (e.g., one or more second terminal cells).

In a further embodiment, the processor 1010 may determine a cost of bandwidth provision to the first terminal cell according to a network status of the base station and a performance requirement of the target service. The network status may include parameters such as network capacity and network loading. The performance requirements of the target service may include parameters such as bandwidth requirements, delay requirements, and quality of service requirements.

In a further embodiment, the processor 1010 is configured to determine whether a trigger request for bandwidth sharing from the first terminal cell is received. Upon determining the receipt of the trigger request for bandwidth sharing from the first terminal cell, the processor 1010 may transmit the trigger request of bandwidth sharing to the SDN controller.

In a further embodiment, the processor 1010 is configured to receive the routing policy respectively configured for the base station, the first terminal cell, and the one or more second terminal cells (which provides bandwidth sharing for the first terminal cell) by the SDN controller. The Processor 1010 is further configured to forward the respective routing policy (configured by the SDN controller) to the corresponding terminal cell.

For the brevity of disclosure, the specific implementation of the abovementioned instructions by the processor 1010 may refer back to the corresponding embodiments illustrated in FIG. 8, thus will not be repeated herein.

The foregoing embodiments of the present disclosure can be utilized in a mobile environment, in a scenario where a T-SC uses a radio bearer as a backhaul. Through bundling backhaul resources of multiple T-SCs for high-bandwidth service usage of a single T-SC, embodiments of the present disclosure achieves flexible bandwidth configuration.

It should be understood by those skilled in the art that in the above description, the embodiments of the present disclosure is described by using the SDN controller and the base station as separate entities. If the SDN controller is integrated in the base station, that is, the SDN controller and the base station are integrated as a single entity, the abovementioned technical solutions still applies in a similar manner. However, in such a case, the interactive signaling between the base station and the SDN controller can be omitted.

The foregoing figures and the corresponding descriptions conclude the disclosure of the instant disclosure. Embodiments of the instant disclosure provide a bandwidth-sharing scheme for terminal cells based on software-defined network (SDN) control, so that a SDN controller can bundle the bandwidth resources of multiple T-SCs on the backhaul link for high-bandwidth services. The disclosed bandwidth-sharing scheme may ensure that the wireless backhaul sharing mechanism between T-SCs can be applied, thereby achieving flexible configuration of bandwidth resources on the backhaul link.

The embodiments shown and described above are only examples. Many details are often found in this field of art thus many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A bandwidth sharing method of terminal cell based on SDN software-defined network (SDN) control, comprising:
   determining, by an SDN controller, whether a trigger request for bandwidth sharing is received, wherein the trigger request indicates a need of bandwidth sharing of a first terminal cell from other terminal cells when processing a target service on a backhaul link, and a bandwidth requirement of the target service equals to or exceeds a first predetermined threshold;
   upon receipt of the trigger request, selecting at least one second terminal cell for providing bandwidth sharing to the first terminal cell;
   controlling the first terminal cell and the at least one second terminal cell to jointly process the target service, comprising:
      respectively configuring a routing policy for each of the first terminal cell and the second terminal cell;
      transmitting the routing policy of the first terminal cell and the second terminal cell to a base station that provides backhaul link to the first terminal cell and the second terminal cell, wherein the base station respectively forwards the routing policy of the first terminal cell and the second terminal cell to a corresponding terminal cell, so as to enable joint routing of service data of the target service to the base station based on the routing policy of the first terminal cell and the second terminal cell;
   configuring a routing policy to a network side server for the base station; and
   sending the routing policy to the network side server of the base station, so as to enable the base station to route the service data to the network side server according to the routing policy for the network side server;
   wherein the routing policy of the first terminal cell and the second terminal cell is configured in accordance with status information of the first terminal cell and the second terminal cell, path information between the first terminal cell and the second terminal cell, and path information between the first terminal cell or the second terminal cell and the base station, the status information of the first terminal cell and the second terminal cell comprising address information, energy consumption information, and available bandwidth information, the path information between the first terminal cell and the second terminal cell comprising path delay information and path cost information, the path information between the first terminal cell or the second terminal cell and the base station comprising path delay information and path cost information.

2. The method of claim 1, further comprising:
determining the number of the second terminal cell based on at least one of capability information of the SDN controller or data characteristics of the target service.

3. The method according to claim 1, wherein the trigger request comprises:
available bandwidth information, bandwidth requirement of the target service, and remaining power information of the first terminal cell.

4. The method of claim 1, wherein
the first terminal cell confirms the need for bandwidth sharing from other terminal cells upon at least one of the following conditions:
   when available bandwidth of the first terminal cell is insufficient to meet the bandwidth requirement of the target service, and
   when remaining power of the first terminal cell is lower than a first predetermined power value.

5. The method according to claim 1,
wherein the first terminal cell determines whether an available bandwidth of the first terminal cell equals to or exceeds a second predetermined threshold, and determines whether the first terminal cell's remaining power equals to or exceeds a second predetermined power value;
upon determining that the available bandwidth equals to or exceeds the second predetermined threshold, and the remaining power equals to or exceeds the second predetermined power value, the first terminal cell transmits an information of the first terminal cell to the SDN controller through the base station, so as to enable the SDN controller to determine whether to select the first terminal cell for providing bandwidth sharing to other terminal cells.

6. The method of claim 1, wherein the SDN controller is integrated in a base station that provides backhaul link to the first and the second terminal cells, the method further comprises:
acquiring, by the base station, the status information of the first terminal cell that processes the target service on the backhaul link, and
based on the status information of the first terminal cell and status information of the base station, determining whether there is a need for bandwidth sharing from the at least one second terminal cell to the first terminal cell, wherein the bandwidth requirement of the target service equals to or exceeds the first predetermined threshold; and
upon determining the need for bandwidth sharing from other terminal cell to the first terminal cell, transmitting to the SDN controller the trigger request for bandwidth sharing.

7. The method of claim 6, wherein the process of determining whether there is a need for bandwidth sharing from the at least one second terminal cell to the first terminal cell based on the status information of the first terminal cell and a status information of the base station comprises:
confirming the need for bandwidth sharing from the second terminal cell to the first terminal cell when:
an available bandwidth of the first terminal cell is insufficient to meet the bandwidth requirement of the target service, and an available bandwidth of the base station is insufficient to be allocated to the first terminal cell, or
a cost for the base station to provide bandwidth to the first terminal cell is higher than expected.

8. The method of claim 7, further comprising:
determining the cost for the base station to provide bandwidth to the first terminal cell based on a network status of the base station and a performance requirement of the target service, wherein the network status includes network capacity and loading, and the performance requirement of the target service includes bandwidth requirement, delay requirement, and quality of service requirement.

9. The method according to claim 6, further comprising:
respectively generating a routing policy by the SDN controller for the base station, the first terminal cell, and the second terminal cell; and
respectively forwarding the routing policy configured by the SDN controller to a corresponding terminal cell, so as to enable joint routing of the service data of the target service to the base station based on the respectively configured routing policy.

10. A software-defined network (SDN) controller, the SDN controller comprising at least one processor and a storage system that stores one or more programs which when executed by the at least one processor, causes the at least one processor to:
determine whether a trigger request for bandwidth sharing is received, wherein the trigger request indicates a need of bandwidth sharing of a first terminal cell from other terminal cells when processing a target service on a backhaul link, and a bandwidth requirement of the target service equals to or exceeds a first predetermined threshold;
select one or more second terminal cells to provide bandwidth sharing for the first terminal cell upon determining receipt of the trigger request;
control the first terminal cell and the one or more second terminal cells to jointly process the target service, comprising:
respectively configuring a routing policy for each of the first terminal cell and the second terminal cell;
transmitting the routing policy of the first terminal cell and the second terminal cell to a base station that provides backhaul link to the first terminal cell and the second terminal cell, wherein the base station respectively forwards the routing policy of the first terminal cell and the second terminal cell to a corresponding terminal cell, so as to enable joint routing of service data of the target service to the base station based on the routing policy of the first terminal cell and the second terminal cell;
configure a routing policy to a network side server for the base station; and
send the routing policy to the network side server to the base station, so as to enable the base station to route the service data to the network side server according to the routing policy for the network side server;
wherein the routing policy of the first terminal cell and the second terminal cell is configured in accordance with status information of the first terminal cell and the second terminal cell, path information between the first terminal cell and the second terminal cell, and path information between the first terminal cell or the second terminal cell and the base station, the status information of the first terminal cell and the second terminal cell comprising address information, energy consumption information, and available bandwidth information, the path information between the first terminal cell and the second terminal cell comprising path delay information and path cost information, the path information between the first terminal cell or the second terminal cell and the base station comprising path delay information and path cost information.

11. The SDN controller of claim 10, wherein the one or more programs when executed by the at least one processor, further causes the at least one processor to:
determine the number of the second terminal cell based on at least one of capability information of the SDN controller or data characteristics of the target service.

12. The SDN controller according to claim 10, wherein the trigger request comprises:
available bandwidth information, bandwidth requirement of the target service, and remaining power information of the first terminal cell.

* * * * *